US012762373B2

(12) United States Patent
Schnitzler et al.

(10) Patent No.: US 12,762,373 B2
(45) **Date of Patent: *Oct. 13, 2026**

(54) SYSTEM AND METHOD FOR ADAPTING TO CHANGING CONSTRAINTS

(71) Applicant: InterDigital CE Patent Holdings, Paris (FR)

(72) Inventors: Francois Schnitzler, Saint Avé (FR); Anne Lambert, Saint-Aubin-d'Aubigné (FR); Francoise Le Bolzer, Rennes (FR)

(73) Assignee: InterDigital CE Patent Holdings, Paris (FR)

( * ) Notice: Subject to any disclaimer, the term of this patent is extended or adjusted under 35 U.S.C. 154(b) by 976 days.

This patent is subject to a terminal disclaimer.

(21) Appl. No.: 17/911,362

(22) PCT Filed: Mar. 12, 2021

(86) PCT No.: PCT/EP2021/056300

§ 371 (c)(1), (2) Date: Sep. 13, 2022

(87) PCT Pub. No.: WO2021/185685

PCT Pub. Date: Sep. 23, 2021

(65) Prior Publication Data

US 2023/0093630 A1 Mar. 23, 2023

(30) Foreign Application Priority Data

Mar. 17, 2020 (EP) .................................... 20305275

(51) Int. Cl.

*G06N 3/044* (2023.01)
*G06N 3/045* (2023.01)

(Continued)

(52) U.S. Cl.

CPC ............. *G06N 3/044* (2023.01); *G06N 3/045* (2023.01); *G06N 3/082* (2013.01); *G06N 3/084* (2013.01); *G06N 5/01* (2023.01)

(58) Field of Classification Search

CPC ........ G06N 3/045; G06N 3/044; G06N 3/082; G06N 3/084; G06N 5/01

See application file for complete search history.

(56) References Cited

U.S. PATENT DOCUMENTS 11,423,259 B1 * 8/2022 Pratusevich ........... G06N 20/00
2016/0328644 A1 * 11/2016 Lin .......................... G06N 3/04

(Continued)

FOREIGN PATENT DOCUMENTS

| | | | | |
|---|---|---|---|---|
| EP | 3543917 A1 | | 9/2019 | |
| WO | 2019114982 A1 | | 6/2019 | |
| WO | WO-2020033898 A1 | * | 2/2020 | G06N 3/063 |

OTHER PUBLICATIONS

Song, Inchul, et al. "Dynamic frame skipping for fast speech recognition in recurrent neural network based acoustic models." 2018 IEEE International Conference on Acoustics, Speech and Signal Processing (ICASSP). IEEE, 2018. (Year: 2018).*

(Continued)

*Primary Examiner* — Andrew L Tank
(74) *Attorney, Agent, or Firm* — Flaster Greenberg P.C.

(57) ABSTRACT

In general, at least one example of an embodiment can involve selecting a neural network from a plurality of neural networks based on an indication of resource availability and processing data using the selected neural network in accordance with the resource availability.

22 Claims, 11 Drawing Sheets

(51) Int. Cl.
*G06N 3/082* (2023.01)
*G06N 3/084* (2023.01)
*G06N 5/01* (2023.01)

(56) References Cited

U.S. PATENT DOCUMENTS

| | | | | |
|---|---|---|---|---|
| 2019/0050751 | A1* | 2/2019 | Assem Aly Salama | H04L 41/24 |
| 2019/0236438 | A1* | 8/2019 | Odena | G06N 3/044 |
| 2020/0012935 | A1* | 1/2020 | Goodsitt | G06V 30/1985 |
| 2020/0126262 | A1* | 4/2020 | Kim | G06T 3/4046 |
| 2020/0272899 | A1* | 8/2020 | Dunne | G06N 3/08 |
| 2020/0327371 | A1* | 10/2020 | Sharma | H04L 67/34 |
| 2020/0364508 | A1* | 11/2020 | Gurel | G06F 18/214 |
| 2021/0056422 | A1* | 2/2021 | Thakker | G06N 3/044 |
| 2021/0089914 | A1* | 3/2021 | Cho | G06N 3/096 |
| 2021/0232873 | A1* | 7/2021 | Kothari | G06V 20/41 |

OTHER PUBLICATIONS

Ardakani, Arash, Zhengyun Ji, and Warren J. Gross. "Learning to skip ineffectual recurrent computations in LSTMs." 2019 Design, Automation & Test in Europe Conference & Exhibition (DATE). IEEE, 2019. (Year: 2019).*

Dennis, Don Kurian, et al. "Shallow RNNs: A method for accurate time-series classification on tiny devices." Proceedings of the 33rd International Conference on Neural Information Processing Systems. 2019. (Year: 2019).*

Kouris, Alexandros, et al. "Approximate LSTMs for time-constrained inference: Enabling fast reaction in self-driving cars." arXiv preprint arXiv:1905.00689 (2019). (Year: 2019).*

Tao, Jin, et al. "Skipping rnn state updates without retraining the original model." Proceedings of the 1st workshop on machine learning on edge in sensor systems. 2019. (Year: 2019).*

"Flexible Recurrent Neural Networks", Lambert Anne et al., Lecture Notes in Computer Science, Feb. 25, 2021.

"Vers des Reseaux de Neurons Recurrents Flexibles", Le Bolzer Francoise et al., Jun. 3, 2020.

"Skip RNN: Learning to Skip State Updates in Recurrent Neural Networks", Cornell University Library, Aug. 22, 2017, Ithaca, NY, Victor Campos et al.

* cited by examiner

Vectors of Markers, Examples

SYSTEM AND METHOD FOR ADAPTING TO CHANGING CONSTRAINTS

CROSS-REFERENCE TO RELATED APPLICATIONS

This application is the 371 National Stage of International Application No. PCT/EP2021/056300, filed Mar. 12, 2021, which claims priority to European Patent Application No. 20305275.8, filed Mar. 17, 2020, the disclosures of which are incorporated herein by reference in their entireties.

TECHNICAL FIELD

The present disclosure involves artificial intelligence systems and methods.

BACKGROUND

Systems such as a home network may contain dedicated resources to manage services in the home in connection with/at the request of heterogeneous consumer electronics (CE) devices in the home. For example, such services can include artificial intelligence (AI) resources, systems and methods used to control CE devices, e.g., by learning and adapting to any of a plurality of variables such as the environment in which devices are located, user(s) of the device, etc. An aspect of such services can be a system or device referred to herein as an "AI hub", a boosted AI CPE ("consumer premises equipment" such as STB, gateway, edge computing resources, etc.). This can be a central node within the system to provide, for example, a) virtualization environment to host AI micro services and b) ensure interoperability with connected CE devices or Edge computing, access to services and resources (compute, storage, video processing, AI/ML accelerator). In addition, an AI hub can offload computational AI tasks to other CE devices registered in the Home Data Center.

SUMMARY

In general, at least one example of an embodiment described herein involves a method comprising: receiving an indication of a resource availability; selecting a neural network from a plurality of neural networks based on the indication; and processing data utilizing the selected neural network in accordance with the resource availability.

In general, at least one example of an embodiment described herein involves a method comprising: selecting a neural network from a plurality of neural networks based on a resource availability; and processing data utilizing the selected neural network based on the resource availability, wherein all of the plurality of neural networks are trained to the same task and each of the plurality of neural networks has a different resource requirement.

In general, at least one example of an embodiment described herein involves a method comprising: training a plurality of neural networks to process a sequence of data associated with a task; determining a first constraint; selecting a first neural network from the plurality of neural networks to process a first portion of the sequence of data based on a first relationship between the first constraint and a first characteristic of the first neural network; determining that the first constraint changes to a second constraint different from the first constraint; and selecting a second neural network from the plurality of neural networks to process a second portion of the sequence of data following the first portion based on a second relationship between the second constraint and a second characteristic of the second neural network.

In general, at least one example of an embodiment described herein involves a method comprising: processing a first portion of a sequence of data associated with a task using a first neural network selected from a plurality of neural networks based on a first relationship between a first data processing constraint and a first characteristic of the first neural network, wherein the plurality of neural networks are all trained to the task; and processing a second portion of the sequence of data following the first portion using a second neural network selected from the plurality of neural networks based on the first data processing constraint changing to a second data processing constraint having a second relationship to a second characteristic of the second neural network.

In general, at least one example of an embodiment described herein involves a method comprising: training a plurality of neural networks to process a sequence of data associated with a task, wherein each of the plurality of neural networks has a computational resource requirement; determining a first computational resource availability; selecting a first neural network from the plurality of neural networks to process a first portion of the sequence of data based on the first computational resource availability being adequate for a first computational resource requirement of the first neural network; determining that the first computational resource availability changes to a second computational resource availability different from the first computational resource availability; and selecting a second neural network from the plurality of neural networks to process a second portion of the sequence of data following the first portion based on the second computational resource availability being adequate for a second computational resource requirement of the second neural network.

In general, at least one example of an embodiment described herein involves a method comprising: training a plurality of neural networks to process a sequence of data associated with a task, wherein each of the plurality of neural networks has a computational resource requirement; determining a first computational resource availability; processing a first portion of the sequence of data using a first one of the plurality of neural networks based on the first computational resource availability being adequate for a first computational resource requirement of the first one of the plurality of neural networks; determining that the first computational resource availability has changed to a second computational resource availability; ceasing processing of the sequence of data using the first one of the plurality of neural networks based on the change to the second computational resource availability; and processing a second portion of the sequence of data following the first portion using a second one of the plurality of neural networks based on the second computational resource availability being adequate for a second computational resource requirement of the second one of the plurality of neural networks.

In general, at least one example of an embodiment described herein involves a method comprising: training a plurality of neural networks to process a sequence of data associated with a task, wherein each of the plurality of neural networks has a resource requirement; determining a resource availability; processing a first portion of the data sequence using a first neural network selected from the plurality of neural networks based on the resource requirement of the first neural network being compatible with the resource availability; detecting a change in the resource availability; and processing a second portion of the sequence of data using a second neural network selected from the plurality of neural networks based on the resource requirement of the second neural network being compatible with the changed resource availability.

In general, at least one example of an embodiment described herein involves a method comprising: determining a data processing constraint; processing a first portion of a data sequence associated with a task using a first neural network selected from a plurality of neural networks based on a characteristic of the first neural network being compatible with the data processing constraint, wherein all of the plurality of neural networks are trained to the task and each of the plurality of neural networks has a respective different characteristic; detecting a change in the data processing constraint; and processing a second portion of the sequence of data using a second neural network selected from the plurality of neural networks based on the characteristic of the second neural network being compatible with the changed data processing constraint.

In general, at least one example of an embodiment described herein involves a method comprising: determining a data processing constraint; selecting a first neural network from a plurality of neural networks to process a first portion of a data sequence associated with a task based on a characteristic of the first neural network being compatible with the data processing constraint, wherein all of the plurality of neural networks are trained to the task and each of the plurality of neural networks has a respective different characteristic; detecting a change in the data processing constraint; and selecting a second neural network from the plurality of neural networks to process a second portion of the sequence of data based on the characteristic of the second neural network being compatible with the changed data processing constraint.

In general, at least one example of an embodiment described herein involves apparatus comprising: one or more processors configured to receive an indication of a resource availability; select a neural network from a plurality of neural networks based on the indication; and process data utilizing the selected neural network in accordance with the resource availability.

In general, at least one example of an embodiment described herein involves apparatus comprising: one or more processors configured to select a neural network from a plurality of neural networks based on a resource availability; and process data utilizing the selected neural network based on the resource availability; wherein all of the plurality of neural networks are trained to the same task and each of the plurality of neural networks has a different resource requirement.

In general, at least one example of an embodiment described herein involves apparatus comprising: one or more processors configured to train a plurality of neural networks to process a sequence of data associated with a task, wherein each of the plurality of neural networks has a respective characteristic; determine a first constraint; select a first neural network from the plurality of neural networks to process a first portion of the sequence of data based on a first relationship between the first constraint and a first characteristic of the first neural network; determine that the first constraint changes to a second constraint different from the first constraint; and select a second neural network from the plurality of neural networks to process a second portion of the sequence of data following the first portion based on a second relationship between the second constraint and a second characteristic of the second neural network.

In general, at least one example of an embodiment described herein involves apparatus comprising: one or more processors configured to process a first portion of a sequence of data associated with a task using a first neural network selected from a plurality of neural networks based on a first relationship between a first data processing constraint and a first characteristic of the first neural network, wherein the plurality of neural networks are all trained to the task; and process a second portion of the sequence of data following the first portion using a second neural network selected from the plurality of neural networks based on the first data processing constraint changing to a second data processing constraint having a second relationship to a second characteristic of the second neural network.

In general, at least one example of an embodiment described herein involves apparatus comprising: one or more processors configured to train a plurality of neural networks to process a sequence of data associated with a task, wherein each of the plurality of neural networks has a computational resource requirement; determine a first computational resource availability; select a first neural network from the plurality of neural networks to process a first portion of the sequence of data based on the first computational resource availability being adequate for a first computational resource requirement of the first neural network; determine that the first computational resource availability changes to a second computational resource availability different from the first computational resource availability; and select a second neural network from the plurality of neural networks to process a second portion of the sequence of data following the first portion based on second computational resource availability being adequate for a second computational resource requirement of the second neural network.

In general, at least one example of an embodiment described herein involves apparatus comprising: one or more processors configured to train a plurality of neural networks to process a sequence of data associated with a task, wherein each of the plurality of neural networks has a computational resource requirement; determine a first computational resource availability; process a first portion of the sequence of data using a first one of the plurality of neural networks based on the first computational resource availability being adequate for a first computational resource requirement of the first one of the plurality of neural networks; determine that the first computational resource availability has changed to a second computational resource availability; cease processing of the sequence of data using the first one of the plurality of neural networks based on the change to the second computational resource availability; and process a second portion of the sequence of data following the first portion using a second one of the plurality of neural networks based on the second computational resource availability being adequate for a second computational resource requirement of the second one of the plurality of neural networks.

In general, at least one example of an embodiment described herein involves apparatus comprising: one or more processors configured to train a plurality of neural networks to process a sequence of data associated with a task, wherein each of the plurality of neural networks has a resource requirement; determine a resource availability; process a first portion of the data sequence using a first neural network selected from the plurality of neural networks based on the resource requirement of the first neural network being compatible with the resource availability; detect a change in the resource availability; and process a second portion of the sequence of data using a second neural network selected from the plurality of neural networks based on the resource requirement of the second neural network being compatible with the changed resource availability.

In general, at least one example of an embodiment described herein involves apparatus comprising: one or more processors configured to determine a data processing constraint; process a first portion of a data sequence associated with a task using a first neural network selected from a plurality of neural networks based on a characteristic of the first neural network being compatible with the data processing constraint, wherein all of the plurality of neural networks are trained to the task and each of the plurality of neural networks has a respective different characteristic; detect a change in the data processing constraint; and process a second portion of the sequence of data using a second neural network selected from the plurality of neural networks based on the characteristic of the second neural network being compatible with the changed data processing constraint.

In general, at least one example of an embodiment described herein involves apparatus comprising: one or more processors configured to determine a data processing constraint; select a first neural network from a plurality of neural networks to process a first portion of a data sequence associated with a task based on a characteristic of the first neural network being compatible with the data processing constraint, wherein all of the plurality of neural networks are trained to the task and each of the plurality of neural networks has a respective different characteristic; detect a change in the data processing constraint; and select a second neural network from the plurality of neural networks to process a second portion of the sequence of data based on the characteristic of the second neural network being compatible with the changed data processing constraint.

In general, at least one example of an embodiment as described herein provides a computer readable storage medium having stored thereon instructions for encoding or decoding video data in accordance with one or more aspects and/or embodiments described herein; and/or a non-transitory computer readable medium storing executable program instructions to cause a computer executing the instructions to perform a method according to any embodiment in accordance with the present disclosure; and/or an electronic device including apparatus as described herein and one or more additional features such as a display or antenna, etc.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWING

The present disclosure may be better understood by considering the detailed description below in conjunction with the accompanying figures, in which:

FIG. 7 illustrates an example of an embodiment of a method in accordance with the present disclosure;

Figure 1:
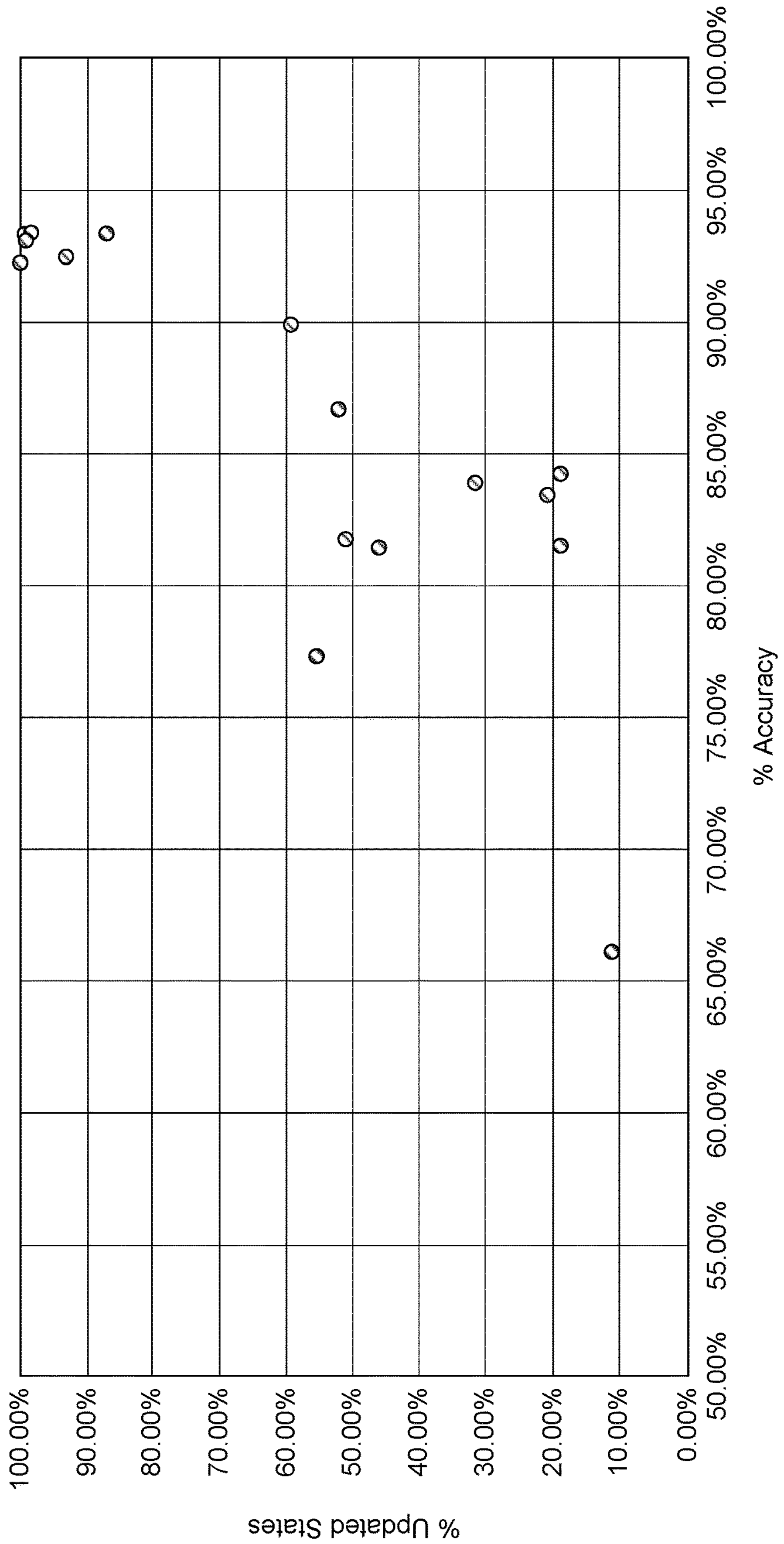
FIG. 1 provides a graph illustrating data processing characteristics of one or more examples of embodiments described herein.

It should be understood that the drawings are for purposes of illustrating examples of various aspects, features and embodiments in accordance with the present disclosure and are not necessarily the only possible configurations. Throughout the various figures, like reference designators refer to the same or similar features.

DETAILED DESCRIPTION

One aspect of AI hub functionality involves allocating computational resources to various AI services. At some point, the demand may exceed the available resources and a control system, or processor, or software, generally referred to herein as an "orchestrator", will operate to limit resources available to some or all services. An orchestrator/scheduler can provide for controlling where and when learning models are executed. For example, an orchestrator/scheduler may provide at least one or more of the following functionalities:

- allocate computational resources to deep models
- decide on which hardware the model is run
- monitor resource availability
- monitor the execution of a process (including a ML model)
- selects the model to be run, including adapting it to resource constrains.

An aspect of the present disclosure involves providing systems and methods that avoid severe disruption or shutdown by enabling adaptation to resource constraints. In general, at least one example of an embodiment described herein involves a flexible AI system that can receive an instruction or instructions from an orchestrator or a scheduler running the AI hub and adapt its configuration or architecture or model in accordance with the instruction.

The use of an orchestrator and flexible AI systems to maintain a reasonable quality of service may also be implemented on a single device running multiple AI processes. For example, a device such as a smartphone can contain dedicated hardware to accelerate AI processes and enabling such devices to run or provide the functionality of an orchestrator. Other possible devices include smart cars, computers, home assistants or other devices capable of communication via a network such as a home network, e.g., Internet of things, or IoT devices.

In addition, edge computing may involve AI processes and associated resource constraints, e.g., where cloud services are run on edge computing nodes close to the user. As an example, when processes are moved to a new edge node, resources or resource constraints might be different.

A deep neural network (DNN) is a complex function. A DNN is composed of several neural layers (typically in series) and each neural layer is composed of several perceptrons. A perceptron is a function involving a linear combination of the inputs and a non-linear function, for example a sigmoid function. Trained by a machine learning algorithm on huge data sets, these models have recently proven extremely useful for a wide range of applications and have led to significant improvements to the state-of-the-art in artificial intelligence, computer vision, audio processing and several other domains.

Recursive neural networks (RNN) denote a class of deep learning architectures specifically designed to process sequences such as sound, videos, text or sensor data. RNN are widely used for such data. Frequently used RNN architectures include long short-term memory (LSTM) networks and gated recurrent units (GRU). Typically, RNN maintain a "state", a vector of variables, over time. This state is supposed to accumulate relevant information and is updated recursively. At a high-level, this is like hidden Markov models. Each input of the sequence is typically a) processed by some deep layers and b) then combined with the previous state through some other deep layers to compute the new state. Hence, the RNN can be seen as a function taking a sequence of inputs $x=(x_1, \ldots, x_T)$ and recursively computing a set of states $s=(s_1, \ldots, s_T)$. Each state $s_t$ is computed from $s_{t-1}$ and $x_t$ by a cell S of the RNN.

Fully processing the input can be resource intensive. In a constrained environment, this may be undesirable. An approach to reduce the computational load of RNNs involves a "skip-RNN" architecture. This architecture is designed to allow the model to skip some inputs by introducing a state update gate. This part of the model is trained along with the other parameters of the model to maximize accuracy while limiting computational cost. The resulting architecture can be described as follows:

$$u_t = f_{binarize}(\tilde{u}_t)$$

$$s_t = u_t S(s_{t-1}, x_t) + (t - u_t)s_{t-1}$$

$$\Delta\tilde{u}_t = \sigma(W\, s_t + b)$$

$$\tilde{u}_{t+1} = u_t\Delta\tilde{u}_t + (1 - u_t)(\tilde{u}_t + \min(\Delta\tilde{u}_t, t - \tilde{u}_t)).$$

In these equations, $f_{binarize}$ denotes a binarization function (in other words, the output is 0 if the input is smaller than 0.5 and 1 otherwise), a a non-linear function and W and b the trainable parameters of the linear part of the state update gate (a perceptron). $f_{binarize}$ can also be a stochastic sampling from a Bernoulli distribution whose parameter is the input $\tilde{u}_t$.

This model is trained on a dataset containing a set of input sequences and label(s) associated to each sequence. The model is trained to minimize a loss computed on this labeled data. The loss is the sum of two terms: one term related to the accuracy of the task (for example cross-entropy for classification or Euclidian loss for regression), and a second term that penalizes computational operations: $L_{budget}=\lambda\Sigma_t u_t$, where $\lambda$ is a weight controlling the strength of the penalty and $u_t$, as defined above, is 0 if there is no update to the state and 1 if there is.

There are other approaches similar to skipRNN that propose an alternative mechanism to reduce computation dynamically based on inputs, for example by also skipping some or only updating part of the state vector. These mechanisms include one or more characteristics such as a decision function as illustrated by the example of the equations above. One particular example of a decision function is a binarization function, e.g., $f_{binarize}$ as described above. Examples of other approaches or mechanisms such as skip-RNN include Jump-LSTM, Skim-RNN, VCRNN, and G-LSTM.

Skip-RNN and other related approaches aim to reduce computation while maintaining accuracy. While they allow the system to run using fewer computational resources, the system is fixed and cannot adapt to changing computational constraints. Furthermore, these approaches do not provide for communication with an orchestrator/scheduler.

In general, at least one example of an embodiment described herein involves an artificial intelligence system or method, e.g., a system or method based on a Recurrent Neural Network (RNN) architecture, that can be controlled, e.g., by an orchestrator, to adapt its computation to available computational resources. However, prior approaches to neural networks, e.g., RNN architectures, do not provide for adapting to changing computational resources. Therefore, systems such as RNNs running on shared hardware might be shut down if other processes require the use of the resources. This includes both multiple networks running on the same hardware (for example, a smartphone or a car) or on different devices (such as a home system with heterogeneous devices).

In general, at least one example of an embodiment described herein involves an AI system and method that can adapt its configuration or architecture based on a constraint such as computational resource availability and/or data processing accuracy requirements.

In general, at least one example of an embodiment described herein involves adapting a neural network, e.g., a RNN, to changing computational constraints during operation, such as in the middle of the analysis of a sequence, by replacing one neural network, e.g., RNN, by another.

In general, at least one example of an embodiment described herein involves adapting computational resources of a neural network, e.g., RNN, at inference time by dynamically exchanging one network with another.

In general, at least one example of an embodiment described herein involves providing for training such families of neural networks, or a plurality of neural networks, e.g., a plurality of RNNs, to achieve the required trade-off of computational cost (e.g., computational resource requirement) and accuracy.

In general, at least one example of an embodiment described herein provides for an orchestrator/scheduler to control the deployment of a plurality of neural networks, e.g., selecting or switching between various ones of a plurality of neural networks, and manipulate the computational cost of the model during execution or processing of data such as a sequence of data.

The following describes various examples of embodiments of methods and apparatus that enable or allow systems, e.g., one or more processors, to adapt the computational cost of a neural network such as a RNN dynamically or on the fly, training such embodiments, and enabling or allowing an orchestrator/scheduler to leverage the described flexibility or capacity to adapt.

In general, at least one example of an embodiment involves a family of at least two neural networks such as RNN with different computational cost and accuracy and trained for the same task, wherein operation involves dynamically exchanging one neural network, e.g., RNN or Recurrent Neural Network, for another in the family. This type of trade-off between cost and accuracy can be achieved using any existing form of neural network, for example skipRNN. FIG. 1 shows an example of such a trade-off. That is, the example of FIG. 1 illustrates trade-offs between accuracy and computational cost achieved by different skipRNN models, trained with a different value for λ, on a permuted MNIST data set. Each point in the figure corresponds to a skipRNN model (using Gated Recurrent Unit architecture for each cell). As the value of λ is changed, the models achieve different behaviors: the number of updates is reduced, but so is accuracy. The latter is first reduced slightly but gradually the gap widens and, when the model is constrained to update its internal states only 10% of the time, accuracy plummets to 65%.

In at least one example of an embodiment, a sequence is analyzed by such a family of models as follows:

1. An initial model matching the available computational resources is selected to begin the analysis. Alternatively, a default model can be specified in the family.
2. Data points of the sequence are analyzed as they arrive/are made available to the model/are given as input to the model.
3. When a constraint such as computational resources available to the process change, another or new model (N) of the family may be selected, where typically the new model N is better suited to the resources and/or the new constraint or context of the task than the current model (C).
4. The current internal state of the RNN is transferred from the current model C to the new model N and this model is used to continue processing the sequence.
5. Go back to step 2.

The analysis ends with the end of the sequence.

Figure 2:
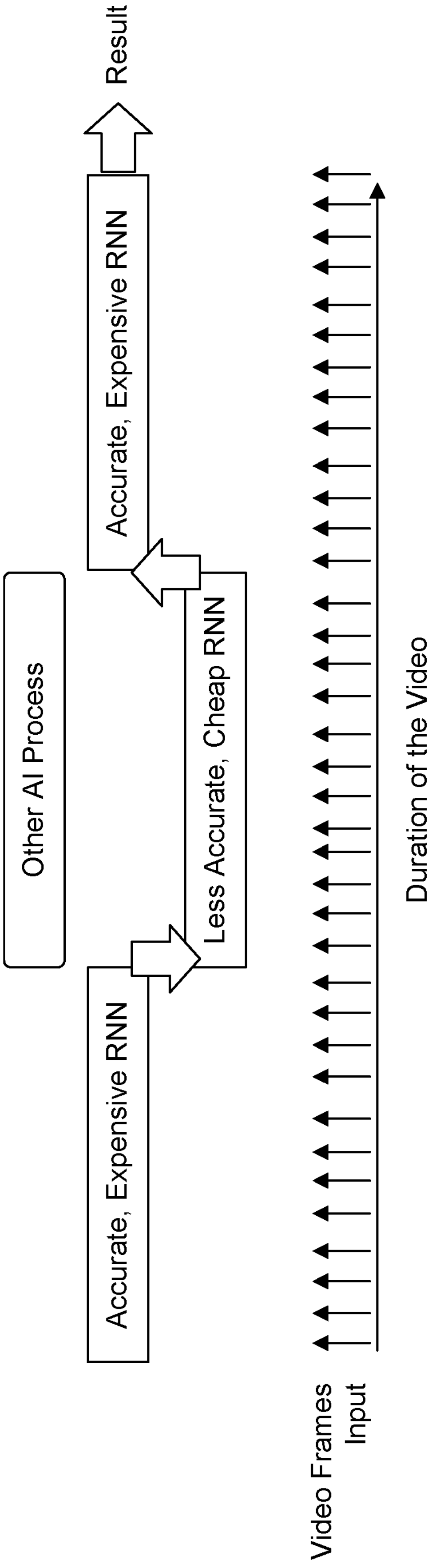
FIG. 2 illustrates data processing of a sequence of data in accordance with one or more examples of systems and methods described herein.

The described example is illustrated in FIG. 2 where the input is identified as a video for illustration purpose but could be any other sequence. In the example of FIG. 2, an accurate but costly (e.g., high or higher computational cost or computational resource requirement) RNN analyzing a video is switched or changed to a less accurate but less costly (e.g., low or lower computational cost or computational resource requirement) RNN. Such a switch or change may be controlled by an orchestrator or scheduler monitoring computational requirements vs. constraints computational resource availability. The orchestrator may determine that computational resource availability has changed, e.g., when another process limits the resources available. Such a change results in a switch to a second neural network of the family having a characteristic (e.g., lower computational cost) compatible with the change in computational resource availability.

In general, the type of neural network in a family or plurality of neural networks can be, e.g., a RNN, such as any type of RNN, including but not limited to GRU, LSTM or end-to-end memory networks.

At point 2 above, inputs such as an input data sequence can also be provided to the model in batches rather than one by one. As with any neural network or RNN, the inputs can be raw data or the output of another neural network or another transformation of data. For example, if the sequence is a video (a sequence of images), an input $x_i$ can for example be an image (a 3D tensor) or a vector computed by applying a convolutional neural network (CNN) to the image or a wavelet transform of this image. If the sequence is an audio recording, an input $x_i$ can be a single value of the waveform or the coefficients or a Fourier transform applied on a sub-window on the audio recording.

At least several implementations of point 4 above are possible. If the new process or model N runs on the same processing hardware as for the model C, then one possible implementation is to stop (halt or cease) the execution, replace the weights of the RNN by the weights of the model N and then resume execution. It is also possible to retrieve the internal state of the model and to start a new RNN process with the model N, to initialize it with the previously recovered internal state and to use it to process the end of the sequence. If the model N runs on another or different hardware than the model C, then the internal state can be extracted from C, communicated using any appropriate transmission protocol (WiFi, ethernet, etc.) to the other processing hardware and used to initialize an instance of the model N. This initialized model will then be used to analyze subsequent incoming data of the sequence.

In general, at least one other example of an embodiment can involve a variant in which hierarchical RNNs are working on top of each other. In that case, there can be one family or plurality of neural networks defined for each level of the hierarchy, or a family containing hierarchical models, or a combination of both.

In general, at least one other example of an embodiment can involve one or more features or aspects described herein wherein a neural network such as a RNN generates a single output (for example, one of a set of classes or labels) or a RNN that generates intermediate outputs (for example, RNNs that output activity labels from sensor data or phonemes from a speech recording).

Each of the plurality of neural networks in a family can have a particular different characteristic such as computational cost and/or accuracy as described above. One of the plurality of neural networks in a family can be selected, e.g., by an orchestrator/scheduler, for processing a portion of a data sequence based on a constraint such as a computational resource availability and/or accuracy requirement. For example, a relationship between a current constraint, e.g., accuracy and/or computational resource availability for processing a first portion of a data sequence, and the characteristic of each of the plurality of neural networks can be evaluated such as by an orchestrator/scheduler. A first neural network can be selected for processing the first portion of the data sequence based on the first neural network's characteristic exhibiting the desired or required relationship to the constraint. Then, if the constraint changes to a second constraint, e.g., with regard to processing a second portion of the data sequence following the first portion, a second neural network can be selected from the plurality of neural networks for processing the second portion based on a second relationship between a second characteristic of the second neural network and the second constraint.

As a specific example, an orchestrator/scheduler can determine whether a characteristic of a first neural network such as computational resource requirements and/or accuracy is appropriate (e.g., sufficient or adequate) with regard to a first constraint such as a first computational resource availability and/or an accuracy requirement for processing a first portion of a data sequence. If so, then the first neural network can be selected from the plurality of neural networks for processing the first portion of the data sequence.

Then, if the constraint changes, e.g., from the first computational resource availability and/or accuracy requirement, to a second constraint, e.g., a different computational resource requirement and/or accuracy requirement for processing a second portion of the data sequence, the orchestrator/scheduler can select a second neural network from the plurality of neural networks for processing the second portion of the data sequence based on the second neural network having a desired or required relationship to the second constraint.

For ease of explanation, the examples described below focus on training methods based on an example of the skipRNN architecture and algorithm. However, the described embodiments can also apply to embodiments involving other forms of neural networks.

A first example of an embodiment of training, herein referred to as embodiment or example A, involves training one model by aligning states to a target. This embodiment provides for training two models whose internal states are similar. Two different RNN models that have a different accuracy/computational cost trade-off are trained while forcing these models to compute similar internal states for the same input sequence.

In more detail, the models are trained as follows:

1. Train one model M1 with a given accuracy/computational cost trade-off by parameterizing its loss function (the term(s) enforcing the trade-off) by hyperparameter $\lambda_1$.
2. Train a second model M2 by a) setting the hyperparameters of its loss to a value $\lambda_2$ enforcing a different accuracy/computational cost trade-off and b) adding an additional term to the loss that enforces that the internal states of M2 have values close to these of internal states of M1 on any sequence. This term can take several forms, for example the I1 loss $$\left(\sum_{t=1}^{T} |s_t^1 - s_t^2|\right)$$

or I2 loss $$\left(\sum_{t=1}^{T} |s_t^1 - s_t^2|\right),$$

where $s^i$ denotes the internal states of the ith model. This term of the loss can also be weighted by a parameter $\mu$ to better control its importance relative to the other terms of the loss.

The second step can be implemented in different ways. For example, model M1 can first be run on all sequences in the data set and the resulting internal states stored with this data set. Then, the training algorithm for M2 can take as input both the initial data set and the precomputed states of M1. In another implementation, the training algorithm for M2 can take as input the initial data set and M1 and recompute the internal states of M1 during training.

Figure 3:
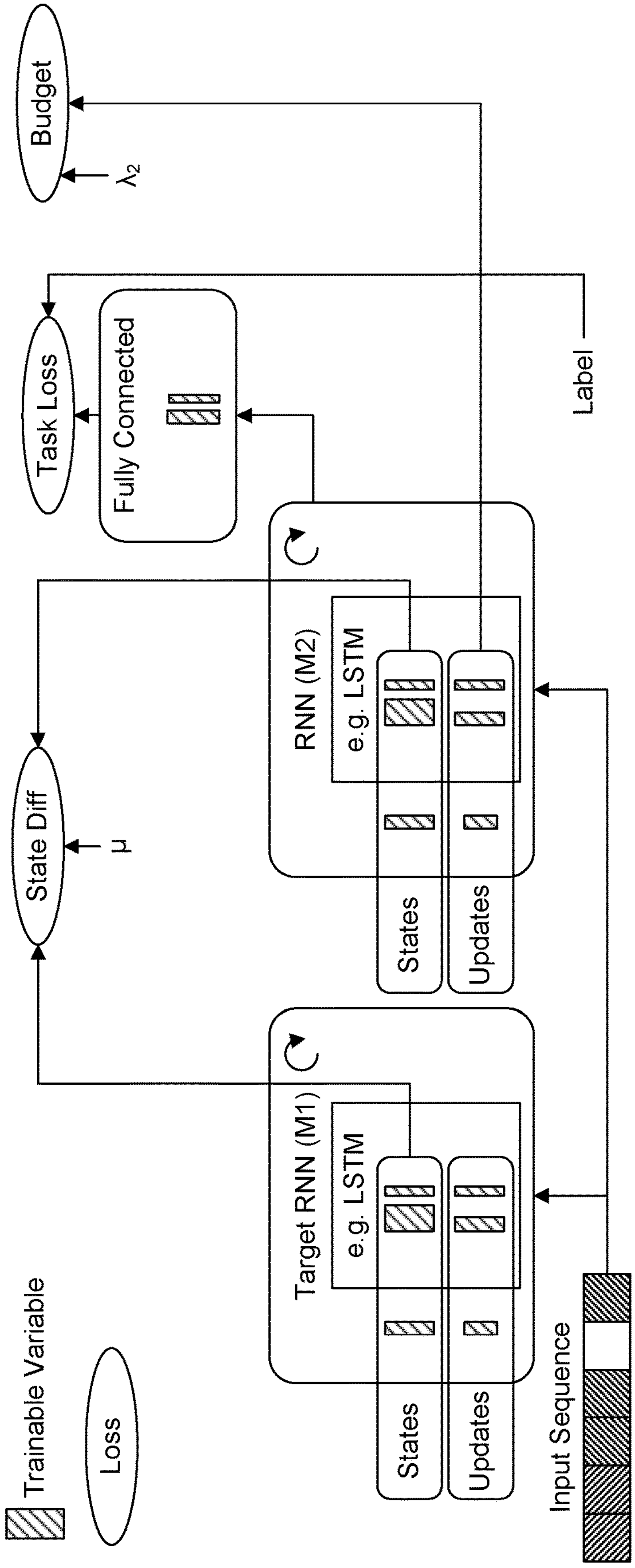
FIGS. 3 to 5 illustrate, in computational flow graph form, various examples of embodiments of methods or apparatus involving one or more aspects of the present disclosure.

A computational graph that illustrates this implementation of embodiment A is displayed in FIG. 3. That is, FIG. 2 shows a computational graph illustrative of training method A, wherein a RNN M2 is trained so that its internal states are similar to these computed by a target RNN (M1). In FIG. 3, the various blocks or features illustrated are as follows:

- Target RNN M1: Used to calculate the internal states of M1
  - Input: input sequence
  - Output: Internal states for each element of the sequence
- RNN M2: Recurrent Neural Network
  - Input: input sequence
  - Outputs:
    - A representation of the complete sequence
    - Internal states for each element of the sequence
    - The amount of elements in the sequence that were used to update its states
- Fully Connected:
  - Input: Representation of the complete sequence as calculated by M2
  - Output: Class prediction
- State Difference loss: ensures that the internal states of M2 stay as close as possible to learned model M1
  - Inputs:
    - Internal states of M1 (could be pre-calculated for each training sequence or re-calculated during training)
    - Internal states of M2
    - Weight $\mu$: control the importance if this loss in the global loss
  - Output: weighted loss of the difference between the internal states of M1 and M2 for the sequence (could be L1 or L2 loss (e.g. squared difference) for example
- Task loss: ensures that the model achieves a good performance in the defined task (in this case good prediction of the class)
  - Inputs:
    - Class prediction
    - Label (ground truth)
  - Output: accuracy
- Budget loss: constraint on the amount of elements in the sequence used (e.g. updates of the RNN cells)
  - Inputs:
    - Amount of updates performed
    - Weight $\lambda_2$: control the budget
- Global Loss (not shown in FIG. 3): Add the different input losses, this forms the constraints put on the model to direct it to learn what we need.
  - Inputs:
    - State Difference Loss
    - Task Loss
    - Budget Loss
  - Output: sum of the input losses As an illustration of the embodiment of FIG. 3, if the architecture of the RNN is skipRNN, then the hyperparameters of the model correspond to lambda. This method can easily be applied to any RNN architecture that allows an accuracy/computational cost trade-off.

One variant of the embodiment of FIG. 3 can involve model M2 having a larger computational budget than M1. Another variant involves the opposite.

In another variant, the values of the hyperparameters $\lambda_2$ can be slowly changed from $\lambda_1$ (or another initial value) to gradually induce a different accuracy/trade-off for M1 and M2. Changes in $\lambda_2$ can also be driven by the evolution of the trade-off for M2. For example, $\lambda_2$ could be modified until M2 achieves a given computational budget, or a given accuracy.

In another variant, models can be trained iteratively. That is, M1 is trained, M2 is trained as described above, then M1 is retrained so that its states are similar to M2, then M2 is trained again, etc.

The described embodiment can easily be extended to more than two models by iteratively building a sequence of models. For models beyond the second, several variants of the additional term in the loss are possible. For example, the values of the internal states of MX can be compared only to those of model M(X−1); or to those of all models M1 to M(X−1), for example by using the sum or the average of the differences between states; or any combination of models previously computed.

In another variant where models are retrained, the models used to provide reference values of the internal state can vary every time a model MX is retrained. For example, when all models have been trained once, a variant of the method could iteratively retrain a model by first choosing two random models MX and MY and then retraining MX by using MY to provide reference values for the internal states of the model.

Further variants can be constructed by constructing the models so that they share some part of the architecture and parameters of the deep learning model. For example, the initialization of the RNNs could be identical; the output layers (that compute an output of the model from the internal states) could be identical; part of the cell S could be identical in both models. Identical parts can either be trained for M1 and then their value kept constant or they can be retrained with M2 (and during any further retraining).

A second example of an embodiment, herein referred to as embodiment or example B, involves training the whole family at the same time. This second embodiment can be viewed as a variant of the first example of an embodiment described above. The states of the model are still forced to take similar values. However, both models M1 and M2 are trained at the same time. Therefore, the loss of the training algorithm may contain the following terms

- Task loss, for example classification or regression error
- Accuracy/computational cost trade-off for M1, with hyperparameters
- Accuracy/computational cost trade-off for M2, with hyperparameters $\lambda_2$
- State alignment term.

Figure 4:
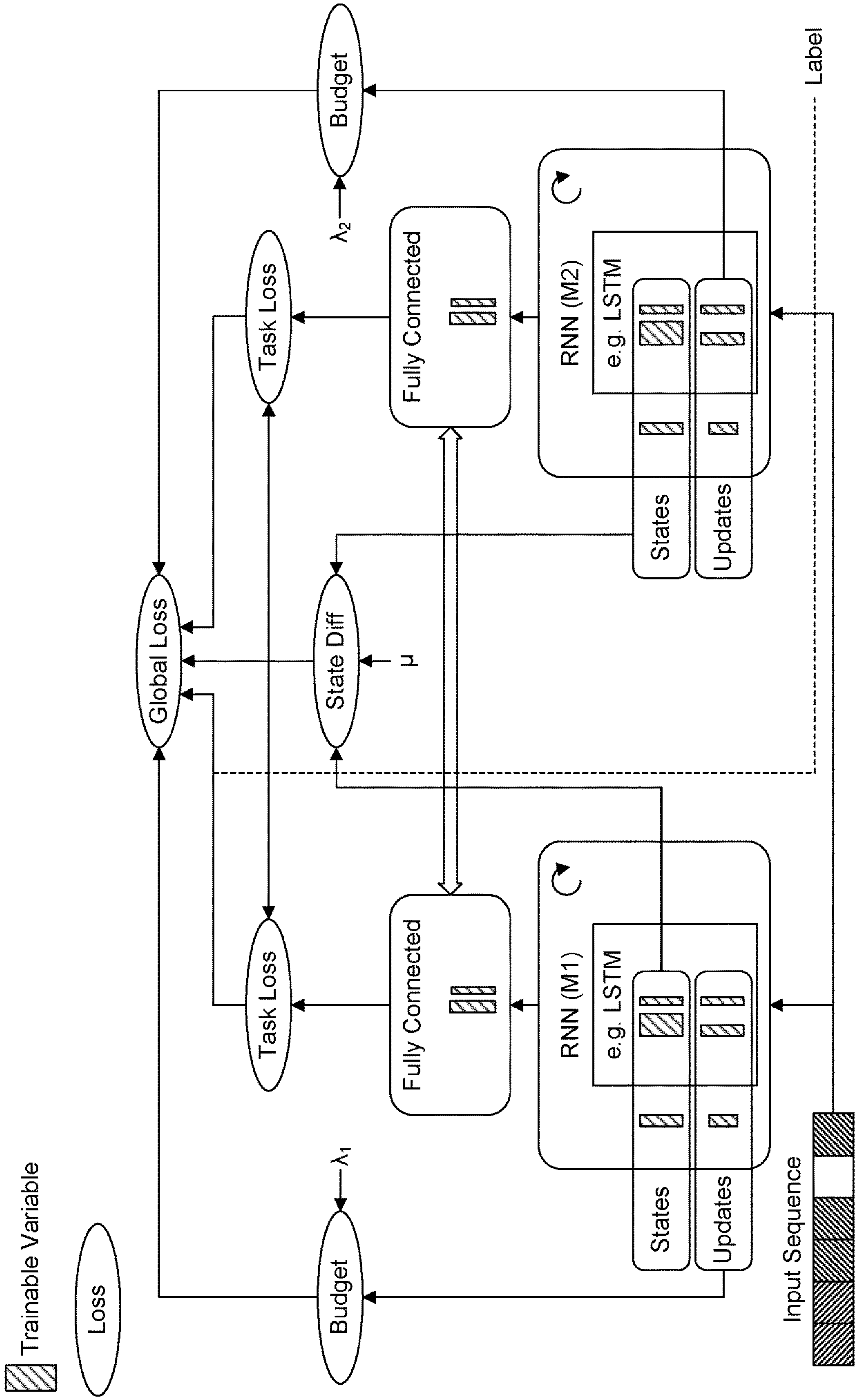

One example of this second embodiment is illustrated by the computational graph shown in FIG. 4, wherein two RNNs M1 and M2 are trained at the same time so that their internal states are similar. The various blocks or features shown in FIG. 4 are as follows.

- RNN M1: Recurrent Neural Network
  - Input: input sequence
  - Outputs:
    - A representation of the complete sequence
    - Internal states for each element of the sequence
    - The amount of elements in the sequence that were used to update its states
- RNN M2: Recurrent Neural Network
  - Input: input sequence
  - Outputs:
    - A representation of the complete sequence
    - Internal states for each element of the sequence
    - The amount of elements in the sequence that were used to update its states
- Fully connected: shared layer between RNN M1 and RNN M2
  - Input: Representation of the complete sequence as calculated by M2
  - Output: Class prediction
- State Difference loss: ensures that the internal states of M2 stay as close as possible to learned model M1
  - Inputs:
    - Internal states of M1 (could be pre-calculated for each training sequence or re-calculated during training)
    - Internal states of M2
    - Weight μ: control the importance if this loss in the global loss
  - Output: weighted loss of the difference between the internal states of M1 et M2 for the sequence (could be L1 or L2 loss (e.g. squared difference) for example)
- Task loss: ensures that the model achieves a good performance in the defined task (in this case good prediction of the class) (1 per model)
  - Inputs:
    - Class prediction
    - Label (ground truth)
  - Output: accuracy
- Budget loss: constraint on the amount of elements in the sequence used (e.g. updates of the RNN cells) (1 per model)
  - Inputs:
    - Amount of updates performed
    - Weight λ: control the budget for a given model
- Global Loss: Add the different input losses, this forms the constraints put on the models to direct them to learn what we need.
  - Inputs:
    - State Difference Loss
    - Task Losses
    - Budget Losses
  - Output: sum of the input losses At least several variants of the second embodiment can be constructed. For example, when training more than two models, additional variants can be constructed by training all models together or training subsets of these models. The size of the subset can also vary during training.

A third example of an embodiment of training, herein referred to as embodiment C, involves interleaving training. This embodiment directly constructs a family of models that can be switched, without explicitly enforcing state similarity. This is instead done implicitly, by directly switching models during training. This example of an embodiment can be implemented, for example, by:

- Initializing two models M1 and M2—this can be done randomly or by first training one or two models on their own.
- Creating a combination of models where the model selected for the computation of a cell S is conditioned on an additional input $c_t$. For example, if $c_t$=1, pick model M1 and if $c_t$=2 not pick model M2.
- Training this combination of models by providing the algorithm with an augmented data set containing a) the initial task data set and b) a sequence c that will select the model at every time step along sequences. The terms of the training loss for this training method will typically include the task loss and the accuracy/computational cost trade-off losses of M1 and M2.

Figure 5:
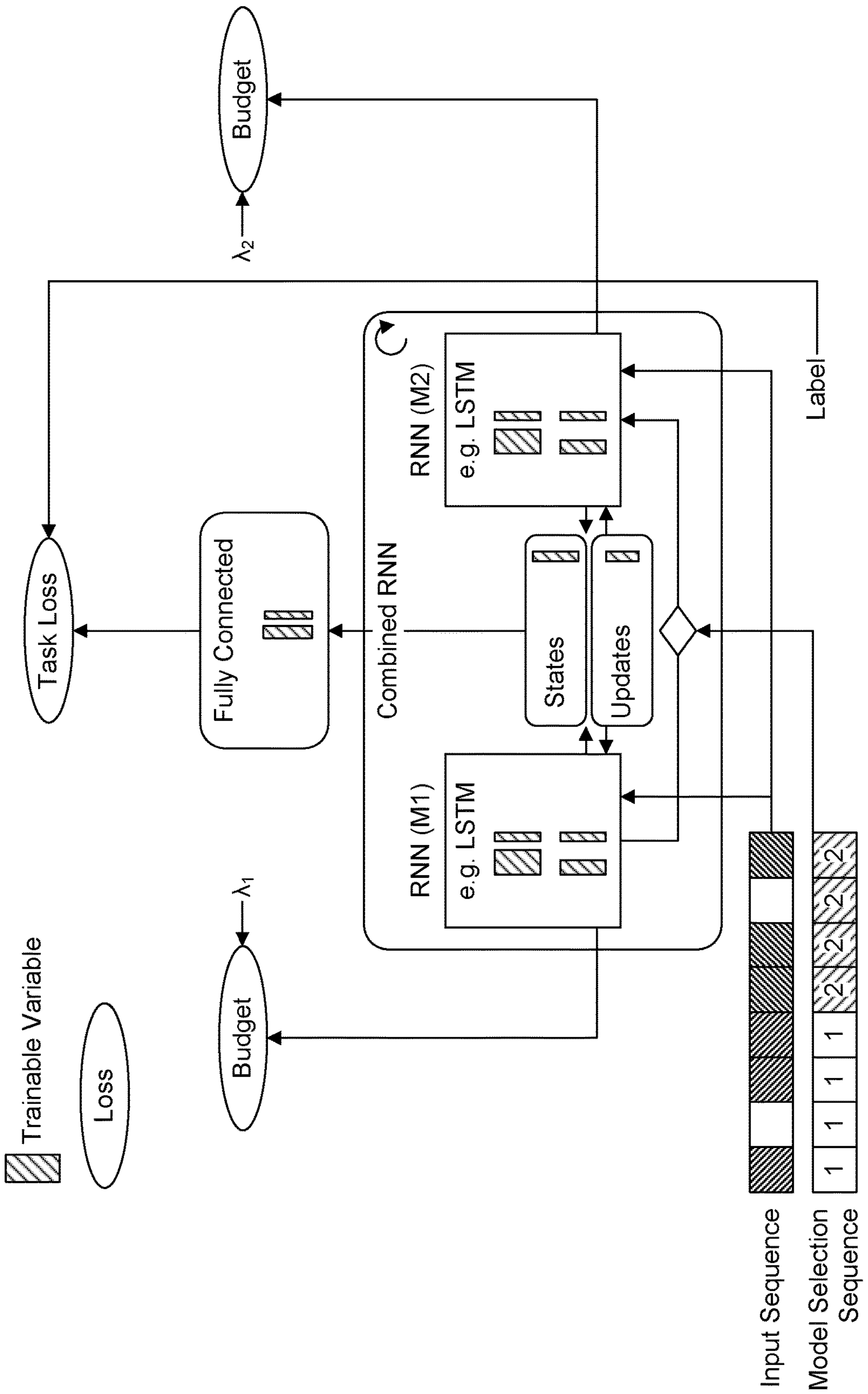

FIG. 5 shows a computational graph illustrating an example of the third embodiment. In the example of FIG. 5, the blocks or features shown are as follows.

Combined RNN:

RNN M1 is called if at time t the model selection value is 1 otherwise RNN M2 is used
- Input: Model selection sequence
- Output: a representation of the complete sequence (built by RNN M1 and RNN M2)
- RNN M1/RNN M2:
  - Inputs:
    - Input sequence
      - Internal state at time t−1
      - Update status time t−1
    - Outputs:
      - Internal state at time t
      - Update status at time t
- Fully connected:
  - Input: Representation of the complete sequence
  - Output: Class prediction
- Task loss: ensures that the model achieves a good performance in the defined task (in this case good prediction of the class)
  - Inputs:
    - Class prediction
    - Label (ground truth)
  - Output: accuracy
- Budget loss: constraint on the amount of elements in the sequence used (e.g. updates of the RNN cells) (1 per model)
  - Inputs:
    - Amount of updates performed
    - Weight λ: control the budget for a given model
- Global Loss (not shown in figure5): Add the different input losses, this forms the constraints put on the models to direct them to learn what we need.
  - Inputs:
    - State Difference Loss
    - Task Losses
    - Budget Losses
- Output: sum of the input losses Many variants of the third embodiment can be constructed by varying the sequences c that control the model used at every step during training. For example, these sequences can be constant and precomputed once before training; they can be randomized for every sequence once; they can be randomized for every sequence every time one is selected for inclusion in a training mini-batch (a typically small subset of a typically large data set, that can fit in memory—cache or RAM—and used to improve the model, typically by computing the gradient used in one-step of a gradient-descent or other optimization algorithm) etc.

Other implementations of this embodiment can be constructed by creating the combination of models differently. For example, such a combination could be hardcoded, for example by performing model switches at regular interval, at fixed time-steps or randomly. Such a combination can also be directly created by constructing a sequence of cells of M1 and M2.

The various embodiments described can also be easily extended to more than two models, for example, by using the same extension mechanisms than for training methods A and B, for example training models incrementally or all together.

Furthermore, several other variants of these methods can be constructed, similarly to what was possible for training methods A and B, including how to set the loss hyperparameters (fixed and different or slowly becoming increasingly different), how to initialize the models, how to train them (once, iteratively, training only one . . . ) or by sharing some parameters between the models or not.

Figure 6:
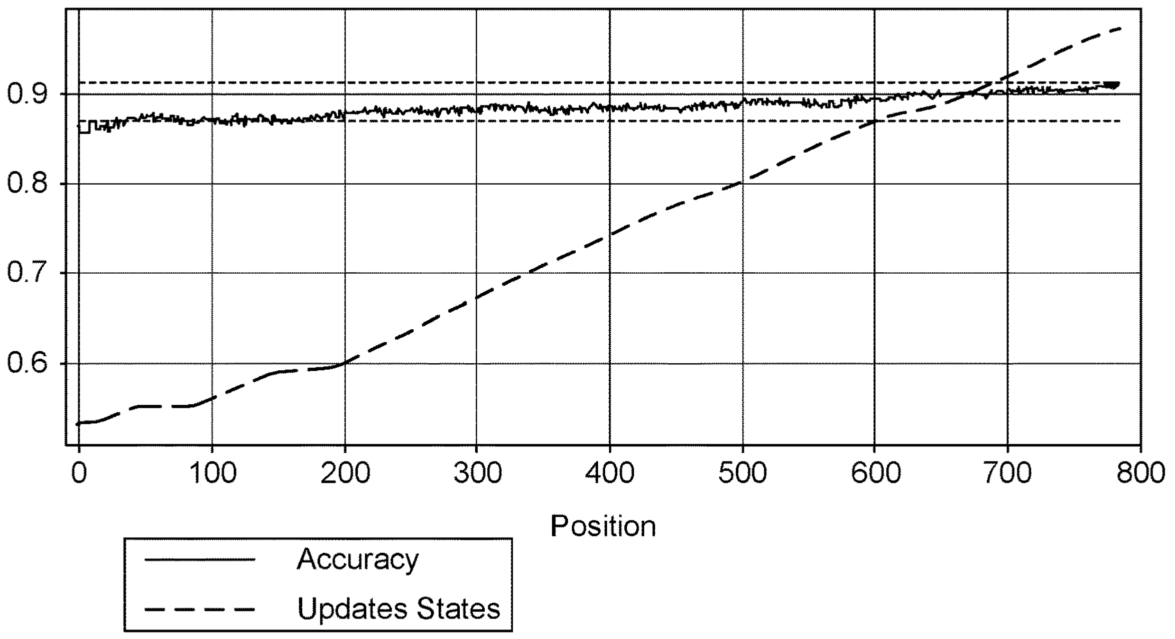
FIGS. 6 and 7 provide graphs illustrating examples of data processing characteristics of one or more examples of embodiments described herein.
Figure 7:
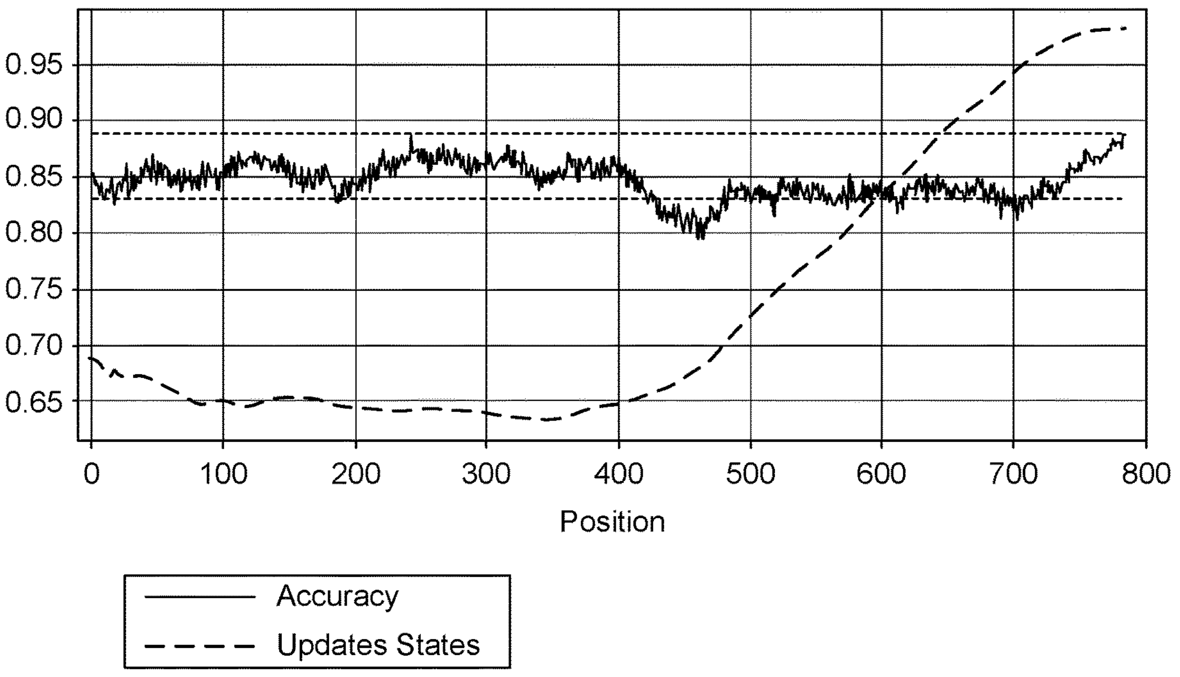

As an example of inference, the first embodiment of a training method as described above was applied with a skipRNN model, with different values for the parameter λ. Training was initialized with a model trained with a value $\lambda_2$. Then, this model was fixed and a copy of this model of this model was trained so that the number of updates of the trained model is larger than this number for the fixed model. FIGS. 6 and 7 described below show that the models of the family can be switched and that accuracy and computational cost of the analysis of the sequence by the combination of model is a noisy linear combination of the values of these metrics for each individual model of the family.

FIG. 6 illustrates the result of the analysis of a sequence by a family of two models M1 and M2, where M1 is replaced by M2 during the analysis of the sequence. FIG. 6 shows the average accuracy and number of updated states (y axis) that results when replacing model M1 by another model M2 at various points (x axis) during the analysis of a sequence of length 800. Dotted lines signal the accuracy of these models. The position when the model switch occurs is the x axis of the figure. Therefore, this figure shows the result of the switch for any position of the sequence. In the example of FIG. 6, M1 is a skip-LSTM (long short term memory network, one type of RNN) and =0 and M2 is the same architecture but with/$\lambda_2$=5 $10^{-4}$. Both accuracy and number of updated states gracefully change from the value of one model to the value of the other.

FIG. 7 illustrates a similar example but with two model switches 300 time steps apart. In FIG. 7, average accuracy and number of updated states are shown when running M1 up to x, switching to M2 for 300 time steps then switching back to M1. Dotted lines signal the accuracy of individual models. In other words, M1 is run until x, then M2 is run for 300 time steps and finally M1 is used until the end of the sequence. In this example, M1 and M2 are a skip-GRU (gated recurrent unit, another type of RNN) with $\lambda_1=10^{-4}$ and $\lambda_2=10^{-3}$. When run on a sequence on their own, these models analyzed on average respectively 89% and 21% of the sequence. This figure shows that a) typically the accuracy of the model is between the accuracy of both models and b) when M2 is run for 300 time steps (so $x \leq 500$), the number of updated states is approximately 65%, which is quite close to 63.5, the average of the expected number of states analyzed by each model, weighted by the ratio of the number of time steps the model was used (300 and 500) and the total number of steps (800).

In both the example of FIG. 6 and that of FIG. 7, the family was trained using example A.

Examples of embodiments useful to control the cost of a model are described next. The examples of embodiments described above can be deployed on a single device to adapt to local load. Various embodiments can also involve deploying a running model to other devices (for example from mobile user equipment to a computer in the building, to the edge or to the cloud) and to switch to a model more suited to the other equipment. The move can also take place in the opposite direction. Various examples of embodiments described below enable an orchestrator/scheduler to monitor and/or allocate resources to processes on the equipment(s) to interact with a family of exchangeable RNNs to dynamically adapt its computational cost (or other metric).

The family may be packaged as a simple model and run/distribute using any existing or future method, for example using a deep learning framework like tensorflow/pytorch, or by coding the model from scratch or by implementing it in an ASIC. In this case, the controller/orchestrator can select the model being run by appending a variable to the input vector and that variable can be used as input to a conditional operator (for example tf.cond) to select the model to be executed at every time step.

The models of the family may also be packaged independently. In that case, a metadata may be attached to the packaged model to state that it is part of a family of flexible RNNs that can be switched. This can for example be implemented by setting a boolean flag or by stating the family identifier. In that case the orchestrator/scheduler could for example select the running model by exiting the current model; recovering the state and launching a new model initialized with the recovered state. It could also trigger a modification of the parameters of the running model. These modifications could be computed on the device or be made available through mechanisms like these discussed above for the model. The new model may be launched in another device different from the original one. In that case, the state must be transmitted.

In addition, the family can expose information about the trade-offs it allows to an orchestrator/scheduler. That is, the family can provide an indication, i.e., the orchestrator/scheduler can receive an indication, regarding such tradeoffs, thereby enabling an orchestrator to monitor and control selecting or switching between models in a family. This information can be exposed through metadata or through other methods. For example, the metadata for the family may contain a table associating to each model name a computational cost (for example expressed in FLOPS) and an accuracy. Metadata can also provide information about the expected delay when switching a model from the family for another. This information could be provided as a delay (for example in ms or number of CPU clock ticks) or through a mathematical formula that depends on hardware characteristics (e.g. size of some/all processor caches, reading speed of storage, transmission speed and bandwidth of busses, etc.) This information can be provided in general or for specific categories of hardware. Metadata can also include information to compute the accuracy that results from the combination of several models. Possible implementations include a mathematical formula, a description (for example "weighted average") or a penalty to be incurred at every switch (for example "−0.5% accuracy per switch"). In addition to or instead of using such metadata, the orchestrator/scheduler can also monitor the execution of the RNNs to obtain or improve an estimate of the behavior of the model in terms of accuracy, computational cost and switch behavior.

The metadata can be attached to the model or family by various methods. For example, they can be attached to the model by including it in the model files, by making them available online and including the url to access them in the model file. If the models are available in an online marketplace or store or any other mechanism to make models available remotely, metadata can be made available on this place through a standardized interface.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

Figure 8:
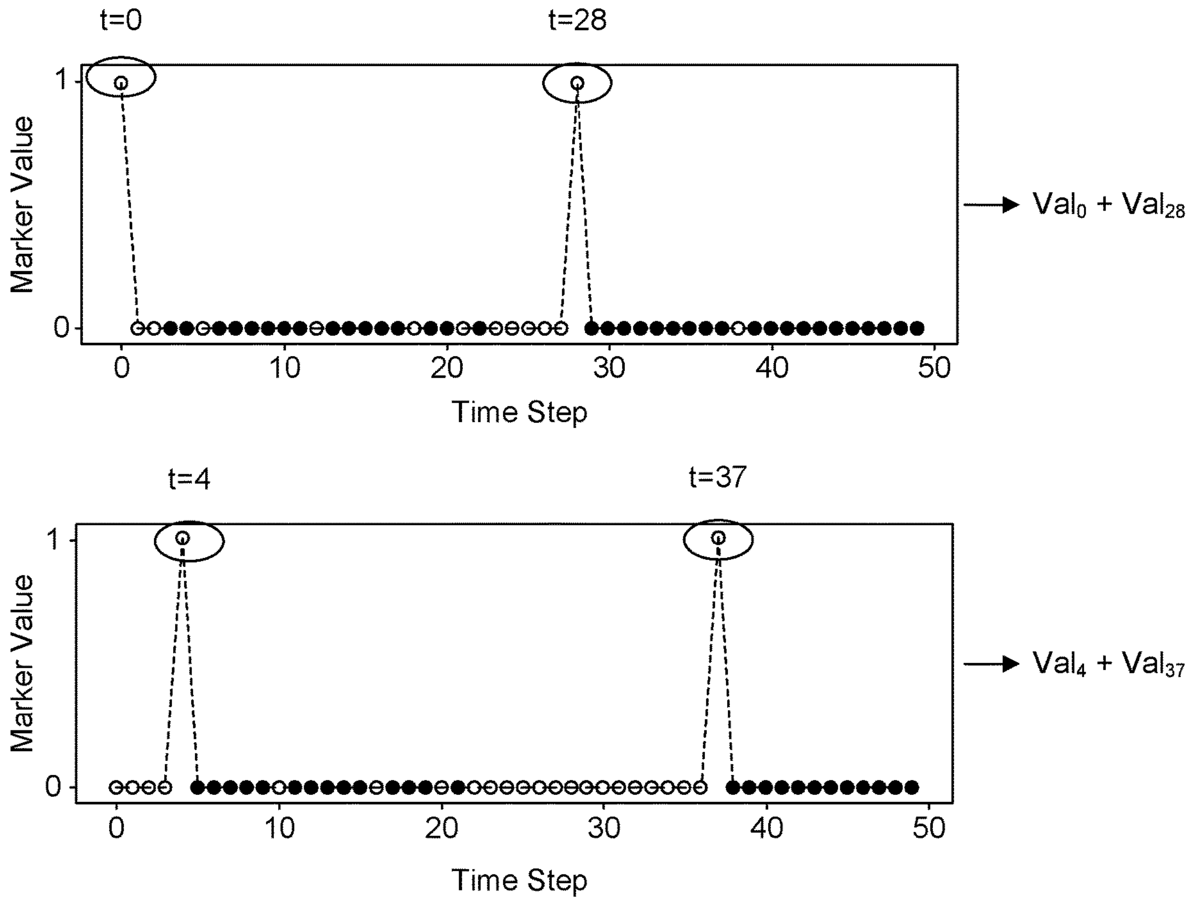
FIG. 8 illustrates an example of a data sequence suitable for processing by one or more examples of embodiments described herein
Figure 9:
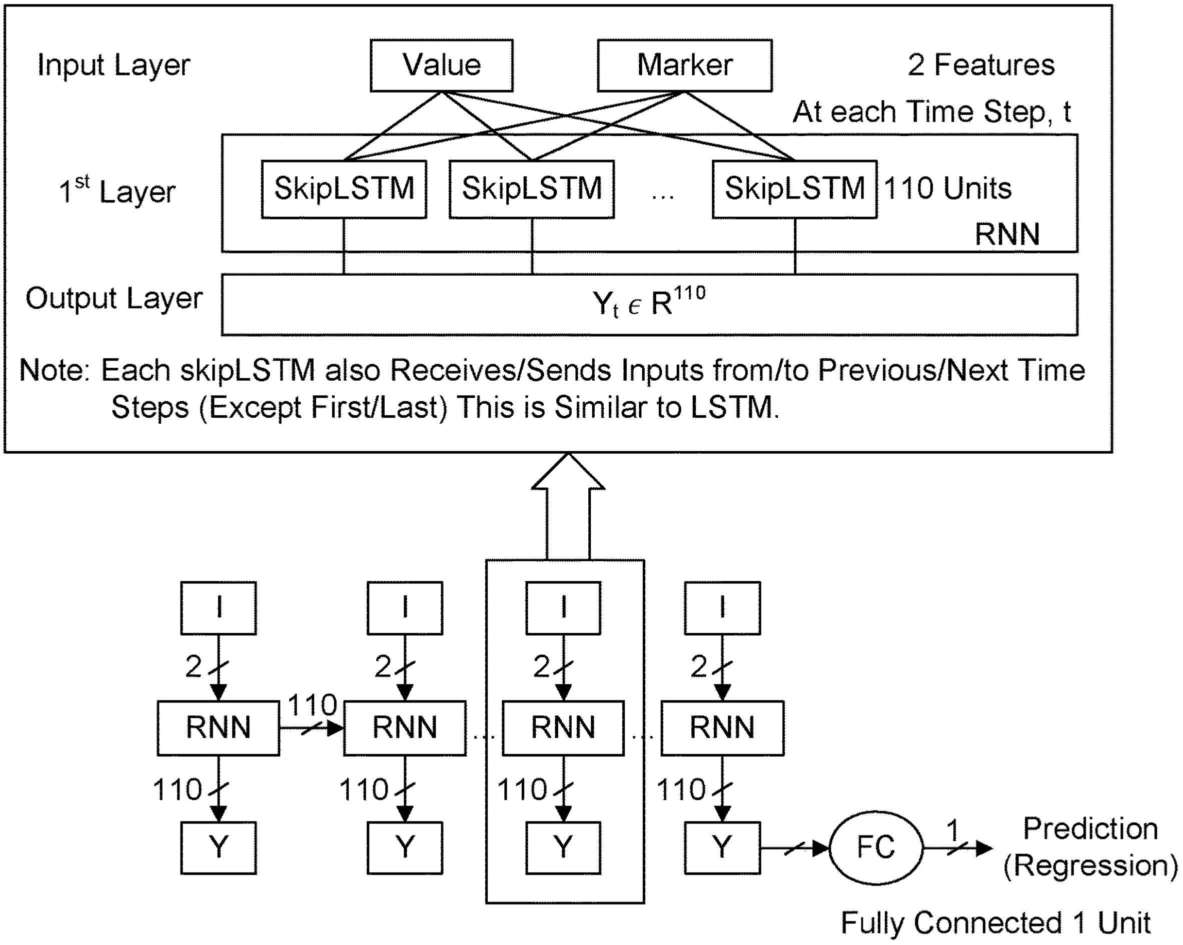
FIG. 9 illustrates an example of an embodiment of a neural network in accordance with one or more aspects or features described herein.
Figure 10:
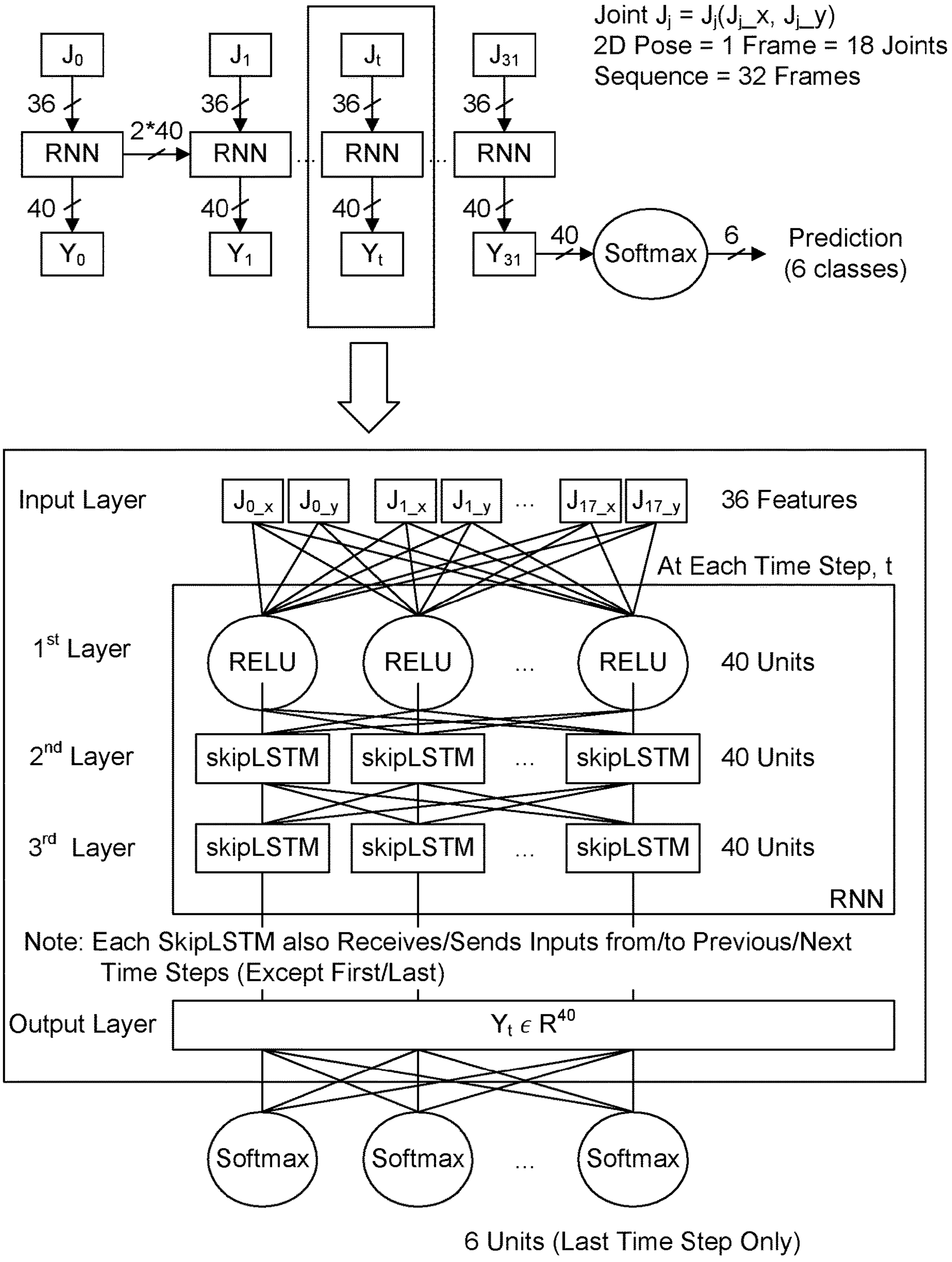
FIG. 10 illustrates another example of an embodiment of a neural network in accordance with one or more aspects or features described herein.
Figure 11:
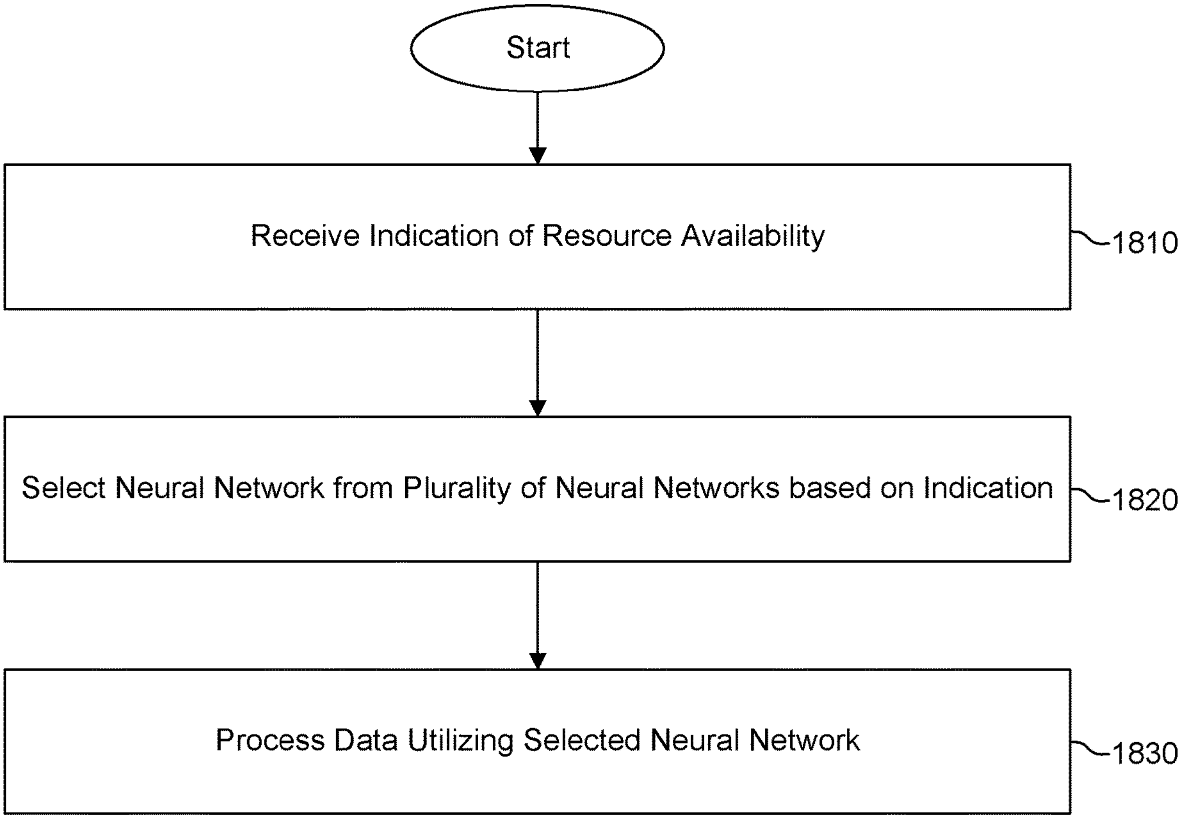
FIG. 11 illustrates an example of an embodiment of a method or apparatus in accordance with the present disclosure.

In general, the examples of embodiments described and contemplated in this document can be implemented in many different forms. For example, FIG. 12 described below provides an embodiment, but other embodiments are contemplated and the discussion of FIG. 8 does not limit the breadth of the implementations. At least one embodiment generally provides an example related to artificial intelligence systems. This and other embodiments can be implemented as a method, an apparatus, a computer readable storage medium or non-transitory computer readable storage medium having stored thereon instructions for implementing one or more of the examples of methods described herein.

Various methods are described herein, and each of the methods comprises one or more steps or actions for achieving the described method. Unless a specific order of steps or actions is required for proper operation of the method, the order and/or use of specific steps and/or actions may be modified or combined.

Various embodiments, e.g., methods, and other aspects described in this document can be used to modify a system such as the example shown in FIG. 12 that is described in detail below. For example, one or more devices, features, modules, etc. of the example of FIG. 12, and/or the arrangement of devices, features, modules, etc. of the system (e.g., architecture of the system) can be modified. Unless indicated otherwise, or technically precluded, the aspects, embodiments, etc. described in this document can be used individually or in combination.

Various numeric values are used in the present document, for example. The specific values are for example purposes and the aspects described are not limited to these specific values.

Figure 12:
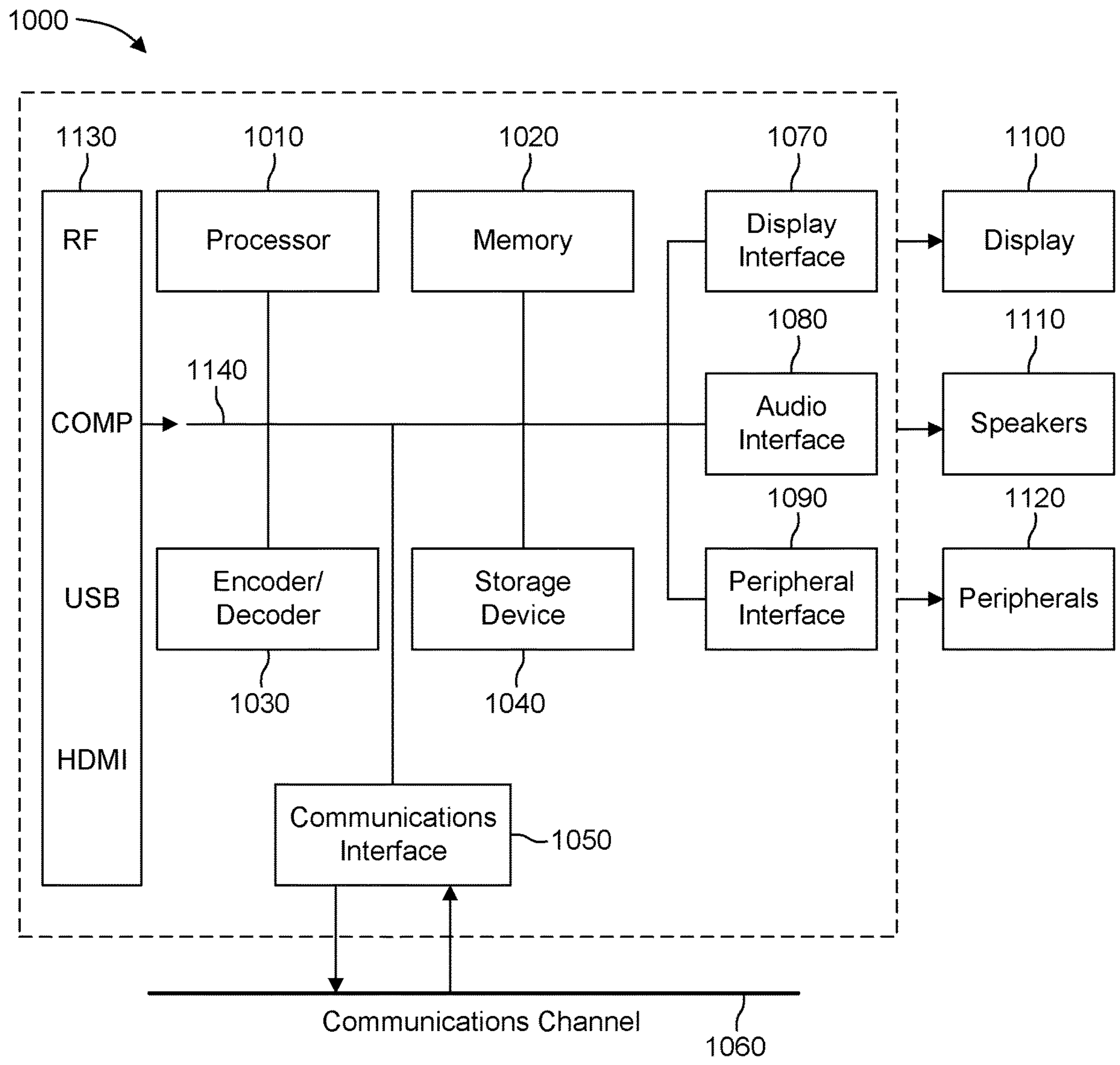
FIG. 12 illustrates an example of an embodiment of a system suitable for implementing one or more aspects of the present disclosure.

FIG. 12 illustrates a block diagram of an example of a system in which various aspects and embodiments can be implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or anon-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 can include an encoder/decoder module 1030 configured, for example, to process image data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during operations such as those described herein. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various generalized as well as particularized embodiments are also supported and contemplated throughout this disclosure. Examples of embodiments in accordance with the present disclosure include but are not limited to the following.

In general, at least one example of an embodiment described herein involves a method comprising: receiving an indication of a resource availability; selecting a neural network from a plurality of neural networks based on the indication; and processing data utilizing the selected neural network in accordance with the resource availability.

In general, at least one example of an embodiment described herein involves a method comprising: selecting a neural network from a plurality of neural networks based on a resource availability; and processing data utilizing the selected neural network based on the resource availability, wherein all of the plurality of neural networks are trained to the same task and each of the plurality of neural networks has a different resource requirement.

In general, at least one example of an embodiment described herein involves a method comprising: training a plurality of neural networks to process a sequence of data associated with a task; determining a first constraint; selecting a first neural network from the plurality of neural networks to process a first portion of the sequence of data based on a first relationship between the first constraint and a first characteristic of the first neural network; determining that the first constraint changes to a second constraint different from the first constraint; and selecting a second neural network from the plurality of neural networks to process a second portion of the sequence of data following the first portion based on a second relationship between the second constraint and a second characteristic of the second neural network.

In general, at least one example of an embodiment described herein involves a method comprising: processing a first portion of a sequence of data associated with a task using a first neural network selected from a plurality of neural networks based on a first relationship between a first data processing constraint and a first characteristic of the first neural network, wherein the plurality of neural networks are all trained to the task; and processing a second portion of the sequence of data following the first portion using a second neural network selected from the plurality of neural networks based on the first data processing constraint changing to a second data processing constraint having a second relationship to a second characteristic of the second neural network.

In general, at least one example of an embodiment described herein involves a method comprising: training a plurality of neural networks to process a sequence of data associated with a task, wherein each of the plurality of neural networks has a computational resource requirement; determining a first computational resource availability; selecting a first neural network from the plurality of neural networks to process a first portion of the sequence of data based on the first computational resource availability being adequate for a first computational resource requirement of the first neural network; determining that the first computational resource availability changes to a second computational resource availability different from the first computational resource availability; and selecting a second neural network from the plurality of neural networks to process a second portion of the sequence of data following the first portion based on the second computational resource availability being adequate for a second computational resource requirement of the second neural network.

In general, at least one example of an embodiment described herein involves a method comprising: training a plurality of neural networks to process a sequence of data associated with a task, wherein each of the plurality of neural networks has a computational resource requirement; determining a first computational resource availability; processing a first portion of the sequence of data using a first one of the plurality of neural networks based on the first computational resource availability being adequate for a first computational resource requirement of the first one of the plurality of neural networks; determining that the first computational resource availability has changed to a second computational resource availability; ceasing processing of the sequence of data using the first one of the plurality of neural networks based on the change to the second computational resource availability; and processing a second portion of the sequence of data following the first portion using a second one of the plurality of neural networks based on the second computational resource availability being adequate for a second computational resource requirement of the second one of the plurality of neural networks.

In general, at least one example of an embodiment described herein involves a method comprising: training a plurality of neural networks to process a sequence of data associated with a task, wherein each of the plurality of neural networks has a resource requirement; determining a resource availability; processing a first portion of the data sequence using a first neural network selected from the plurality of neural networks based on the resource requirement of the first neural network being compatible with the resource availability; detecting a change in the resource availability; and processing a second portion of the sequence of data using a second neural network selected from the plurality of neural networks based on the resource requirement of the second neural network being compatible with the changed resource availability.

In general, at least one example of an embodiment described herein involves a method comprising: determining a data processing constraint; processing a first portion of a data sequence associated with a task using a first neural network selected from a plurality of neural networks based on a characteristic of the first neural network being compatible with the data processing constraint, wherein all of the plurality of neural networks are trained to the task and each of the plurality of neural networks has a respective different characteristic; detecting a change in the data processing constraint; and processing a second portion of the sequence of data using a second neural network selected from the plurality of neural networks based on the characteristic of the second neural network being compatible with the changed data processing constraint.

In general, at least one example of an embodiment described herein involves a method comprising: determining a data processing constraint; selecting a first neural network from a plurality of neural networks to process a first portion of a data sequence associated with a task based on a characteristic of the first neural network being compatible with the data processing constraint, wherein all of the plurality of neural networks are trained to the task and each of the plurality of neural networks has a respective different characteristic; detecting a change in the data processing constraint; and selecting a second neural network from the plurality of neural networks to process a second portion of the sequence of data based on the characteristic of the second neural network being compatible with the changed data processing constraint.

In general, at least one example of an embodiment described herein involves apparatus comprising: one or more processors configured to receive an indication of a resource availability; select a neural network from a plurality of neural networks based on the indication; and process data utilizing the selected neural network in accordance with the resource availability.

In general, at least one example of an embodiment described herein involves apparatus comprising: one or more processors configured to select a neural network from a plurality of neural networks based on a resource availability; and process data utilizing the selected neural network based on the resource availability; wherein all of the plurality of neural networks are trained to the same task and each of the plurality of neural networks has a different resource requirement.

In general, at least one example of an embodiment described herein involves apparatus comprising: one or more processors configured to train a plurality of neural networks to process a sequence of data associated with a task, wherein each of the plurality of neural networks has a respective characteristic; determine a first constraint; select a first neural network from the plurality of neural networks to process a first portion of the sequence of data based on a first relationship between the first constraint and a first characteristic of the first neural network; determine that the first constraint changes to a second constraint different from the first constraint; and select a second neural network from the plurality of neural networks to process a second portion of the sequence of data following the first portion based on a second relationship between the second constraint and a second characteristic of the second neural network.

In general, at least one example of an embodiment described herein involves apparatus comprising: one or more processors configured to process a first portion of a sequence of data associated with a task using a first neural network selected from a plurality of neural networks based on a first relationship between a first data processing constraint and a first characteristic of the first neural network, wherein the plurality of neural networks are all trained to the task; and process a second portion of the sequence of data following the first portion using a second neural network selected from the plurality of neural networks based on the first data processing constraint changing to a second data processing constraint having a second relationship to a second characteristic of the second neural network.

In general, at least one example of an embodiment described herein involves apparatus comprising: one or more processors configured to train a plurality of neural networks to process a sequence of data associated with a task, wherein each of the plurality of neural networks has a computational resource requirement; determine a first computational resource availability; select a first neural network from the plurality of neural networks to process a first portion of the sequence of data based on the first computational resource availability being adequate for a first computational resource requirement of the first neural network; determine that the first computational resource availability changes to a second computational resource availability different from the first computational resource availability; and select a second neural network from the plurality of neural networks to process a second portion of the sequence of data following the first portion based on second computational resource availability being adequate for a second computational resource requirement of the second neural network.

In general, at least one example of an embodiment described herein involves apparatus comprising: one or more processors configured to train a plurality of neural networks to process a sequence of data associated with a task, wherein each of the plurality of neural networks has a computational resource requirement; determine a first computational resource availability; process a first portion of the sequence of data using a first one of the plurality of neural networks based on the first computational resource availability being adequate for a first computational resource requirement of the first one of the plurality of neural networks; determine that the first computational resource availability has changed to a second computational resource availability; cease processing of the sequence of data using the first one of the plurality of neural networks based on the change to the second computational resource availability; and process a second portion of the sequence of data following the first portion using a second one of the plurality of neural networks based on the second computational resource availability being adequate for a second computational resource requirement of the second one of the plurality of neural networks.

In general, at least one example of an embodiment described herein involves apparatus comprising: one or more processors configured to train a plurality of neural networks to process a sequence of data associated with a task, wherein each of the plurality of neural networks has a resource requirement; determine a resource availability;

process a first portion of the data sequence using a first neural network selected from the plurality of neural networks based on the resource requirement of the first neural network being compatible with the resource availability; detect a change in the resource availability; and process a second portion of the sequence of data using a second neural network selected from the plurality of neural networks based on the resource requirement of the second neural network being compatible with the changed resource availability.

In general, at least one example of an embodiment described herein involves apparatus comprising: one or more processors configured to determine a data processing constraint; process a first portion of a data sequence associated with a task using a first neural network selected from a plurality of neural networks based on a characteristic of the first neural network being compatible with the data processing constraint, wherein all of the plurality of neural networks are trained to the task and each of the plurality of neural networks has a respective different characteristic; detect a change in the data processing constraint; and process a second portion of the sequence of data using a second neural network selected from the plurality of neural networks based on the characteristic of the second neural network being compatible with the changed data processing constraint.

In general, at least one example of an embodiment described herein involves apparatus comprising: one or more processors configured to determine a data processing constraint; select a first neural network from a plurality of neural networks to process a first portion of a data sequence associated with a task based on a characteristic of the first neural network being compatible with the data processing constraint, wherein all of the plurality of neural networks are trained to the task and each of the plurality of neural networks has a respective different characteristic; detect a change in the data processing constraint; and select a second neural network from the plurality of neural networks to process a second portion of the sequence of data based on the characteristic of the second neural network being compatible with the changed data processing constraint.

In general, at least one example of an embodiment can involve a computer program product including instructions, which, when executed by a computer, cause the computer to carry out any one or more of the methods described herein.

In general, at least one example of an embodiment can involve a non-transitory computer readable medium storing executable program instructions to cause a computer executing the instructions to perform any one or more of the methods described herein.

In general, at least one example of an embodiment can involve a device comprising an apparatus according to any embodiment of apparatus as described herein, and at least one of (i) an antenna configured to receive a signal, the signal including data representative of information such as instructions from an orchestrator, (ii) a band limiter configured to limit the received signal to a band of frequencies that includes the data representative of the information, and (iii) a display configured to display an image such as a displayed representation of the data representative of the instructions.

In general, at least one example of an embodiment can involve a device as described herein, wherein the device comprises one of a television, a television signal receiver, a set-top box, a gateway device, a mobile device, a cell phone, a tablet, or other electronic device.

Regarding the various embodiments described herein and the figures illustrating various embodiments, when a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, one or more of a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments have been described. Embodiments may include any of the following features or entities, alone or in any combination, across various different claim categories and types:

- Providing for receiving an indication of a resource availability; selecting a neural network from a plurality of neural networks based on the indication; and processing data utilizing the selected neural network in accordance with the resource availability.
- Providing for selecting a neural network from a plurality of neural networks based on a resource availability; and processing data utilizing the selected neural network based on the resource availability, wherein all of the plurality of neural networks are trained to the same task and each of the plurality of neural networks has a different resource requirement.
- Providing for training a plurality of neural networks to process a sequence of data associated with a task; determining a first constraint; selecting a first neural network from the plurality of neural networks to process a first portion of the sequence of data based on a first relationship between the first constraint and a first characteristic of the first neural network; determining that the first constraint changes to a second constraint different from the first constraint; and selecting a second neural network from the plurality of neural networks to process a second portion of the sequence of data following the first portion based on a second relationship between the second constraint and a second characteristic of the second neural network.
- Providing for processing a first portion of a sequence of data associated with a task using a first neural network selected from a plurality of neural networks based on a first relationship between a first data processing constraint and a first characteristic of the first neural network, wherein the plurality of neural networks are all trained to the task; and processing a second portion of the sequence of data following the first portion using a second neural network selected from the plurality of neural networks based on the first data processing constraint changing to a second data processing constraint having a second relationship to a second characteristic of the second neural network.
- Providing for training a plurality of neural networks to process a sequence of data associated with a task, wherein each of the plurality of neural networks has a computational resource requirement; determining a first computational resource availability; selecting a first neural network from the plurality of neural networks to process a first portion of the sequence of data based on the first computational resource availability being adequate for a first computational resource requirement of the first neural network; determining that the first computational resource availability changes to a second computational resource availability different from the first computational resource availability; and selecting a second neural network from the plurality of neural networks to process a second portion of the sequence of data following the first portion based on the second computational resource availability being adequate for a second computational resource requirement of the second neural network.
- Providing for training a plurality of neural networks to process a sequence of data associated with a task, wherein each of the plurality of neural networks has a computational resource requirement; determining a first computational resource availability; processing a first portion of the sequence of data using a first one of the plurality of neural networks based on the first computational resource availability being adequate for a first computational resource requirement of the first one of the plurality of neural networks; determining that the first computational resource availability has changed to a second computational resource availability; ceasing processing of the sequence of data using the first one of the plurality of neural networks based on the change to the second computational resource availability; and processing a second portion of the sequence of data following the first portion using a second one of the plurality of neural networks based on the second computational resource availability being adequate for a second computational resource requirement of the second one of the plurality of neural networks.
- Providing for training a plurality of neural networks to process a sequence of data associated with a task, wherein each of the plurality of neural networks has a resource requirement; determining a resource availability; processing a first portion of the data sequence using a first neural network selected from the plurality of neural networks based on the resource requirement of the first neural network being compatible with the resource availability; detecting a change in the resource availability; and processing a second portion of the sequence of data using a second neural network selected from the plurality of neural networks based on the resource requirement of the second neural network being compatible with the changed resource availability.

Providing for determining a data processing constraint; processing a first portion of a data sequence associated with a task using a first neural network selected from a plurality of neural networks based on a characteristic of the first neural network being compatible with the data processing constraint, wherein all of the plurality of neural networks are trained to the task and each of the plurality of neural networks has a respective different characteristic; detecting a change in the data processing constraint; and processing a second portion of the sequence of data using a second neural network selected from the plurality of neural networks based on the characteristic of the second neural network being compatible with the changed data processing constraint.

Providing for determining a data processing constraint; selecting a first neural network from a plurality of neural networks to process a first portion of a data sequence associated with a task based on a characteristic of the first neural network being compatible with the data processing constraint, wherein all of the plurality of neural networks are trained to the task and each of the plurality of neural networks has a respective different characteristic; detecting a change in the data processing constraint; and selecting a second neural network from the plurality of neural networks to process a second portion of the sequence of data based on the characteristic of the second neural network being compatible with the changed data processing constraint.

Providing for one or more processors configured to receive an indication of a resource availability; select a neural network from a plurality of neural networks based on the indication; and process data utilizing the selected neural network in accordance with the resource availability.

Providing for one or more processors configured to select a neural network from a plurality of neural networks based on a resource availability; and process data utilizing the selected neural network based on the resource availability; wherein all of the plurality of neural networks are trained to the same task and each of the plurality of neural networks has a different resource requirement.

Providing for one or more processors configured to train a plurality of neural networks to process a sequence of data associated with a task, wherein each of the plurality of neural networks has a respective characteristic; determine a first constraint; select a first neural network from the plurality of neural networks to process a first portion of the sequence of data based on a first relationship between the first constraint and a first characteristic of the first neural network; determine that the first constraint changes to a second constraint different from the first constraint; and select a second neural network from the plurality of neural networks to process a second portion of the sequence of data following the first portion based on a second relationship between the second constraint and a second characteristic of the second neural network.

Providing for one or more processors configured to process a first portion of a sequence of data associated with a task using a first neural network selected from a plurality of neural networks based on a first relationship between a first data processing constraint and a first characteristic of the first neural network, wherein the plurality of neural networks are all trained to the task; and process a second portion of the sequence of data following the first portion using a second neural network selected from the plurality of neural networks based on the first data processing constraint changing to a second data processing constraint having a second relationship to a second characteristic of the second neural network.

Providing for one or more processors configured to train a plurality of neural networks to process a sequence of data associated with a task, wherein each of the plurality of neural networks has a computational resource requirement; determine a first computational resource availability; select a first neural network from the plurality of neural networks to process a first portion of the sequence of data based on the first computational resource availability being adequate for a first computational resource requirement of the first neural network; determine that the first computational resource availability changes to a second computational resource availability different from the first computational resource availability; and select a second neural network from the plurality of neural networks to process a second portion of the sequence of data following the first portion based on second computational resource availability being adequate for a second computational resource requirement of the second neural network.

Providing for one or more processors configured to train a plurality of neural networks to process a sequence of data associated with a task, wherein each of the plurality of neural networks has a computational resource requirement; determine a first computational resource availability; process a first portion of the sequence of data using a first one of the plurality of neural networks based on the first computational resource availability being adequate for a first computational resource requirement of the first one of the plurality of neural networks; determine that the first computational resource availability has changed to a second computational resource availability; cease processing of the sequence of data using the first one of the plurality of neural networks based on the change to the second computational resource availability; and process a second portion of the sequence of data following the first portion using a second one of the plurality of neural networks based on the second computational resource availability being adequate for a second computational resource requirement of the second one of the plurality of neural networks.

Providing for one or more processors configured to train a plurality of neural networks to process a sequence of data associated with a task, wherein each of the plurality of neural networks has a resource requirement; determine a resource availability; process a first portion of the data sequence using a first neural network selected from the plurality of neural networks based on the resource requirement of the first neural network being compatible with the resource availability; detect a change in the resource availability; and process a second portion of the sequence of data using a second neural network selected from the plurality of neural networks based on the resource requirement of the second neural network being compatible with the changed resource availability.

Providing for one or more processors configured to determine a data processing constraint; process a first portion of a data sequence associated with a task using a first neural network selected from a plurality of neural networks based on a characteristic of the first neural network being compatible with the data processing constraint, wherein all of the plurality of neural networks are trained to the task and each of the plurality of neural networks has a respective different characteristic; detect a change in the data processing constraint; and process a second portion of the sequence of data using a second neural network selected from the plurality of neural networks based on the characteristic of the second neural network being compatible with the changed data processing constraint.

Providing for one or more processors configured to determine a data processing constraint; select a first neural network from a plurality of neural networks to process a first portion of a data sequence associated with a task based on a characteristic of the first neural network being compatible with the data processing constraint, wherein all of the plurality of neural networks are trained to the task and each of the plurality of neural networks has a respective different characteristic; detect a change in the data processing constraint; and select a second neural network from the plurality of neural networks to process a second portion of the sequence of data based on the characteristic of the second neural network being compatible with the changed data processing constraint.

Providing for a plurality of neural networks as described herein comprising at least two recurrent neural networks and a data processing constraint comprising at least one of a computational resource availability or an accuracy requirement, and a characteristic of each of the plurality of neural networks comprising a respective at least one of a computational resource requirement or an accuracy.

Providing for a plurality of neural networks as described herein comprising at least two recurrent neural networks with respective different resource requirements and with each of the at least two recurrent neural networks being trained for the same task.

Providing for processing data by a plurality of neural networks as described herein wherein data comprises a sequence of data points; and selecting a neural network from the plurality of neural networks comprises selecting an initial neural network matching a resource availability; and processing the data comprises analyzing data points of the sequence as the data points are received; determining a change to the resource availability based on a change of an indication; selecting a second one of the plurality of neural networks other than the initial neural network; transferring an internal state of the initial neural network to the second one of the plurality of neural networks; and processing data points of the data sequence using the second one of the plurality of neural networks.

Providing for processing data by a plurality of neural networks including an initial neural network or first neural network and a second neural network, wherein transferring an internal state of the initial neural network to the second one of the plurality of neural networks comprises halting the processing of data points; replacing one or more weights of the initial or first neural network with corresponding one or more weights of the second one of the plurality of neural networks; and resuming the processing of the data points.

Providing for transferring the internal state of an initial neural network to a second one of a plurality of neural networks comprising retrieving an internal state of the initial neural network; and initializing the second one of the plurality of neural networks with the internal state.

Providing for processing data using a plurality of neural networks including an initial or first neural network and a second neural network comprising the initial neural network is associated with a first processor and the second one of the plurality of neural networks is associated with a second processor different from the first processor; and initializing the second one of the plurality of neural networks with an internal state comprises communicating the internal state from the first processor to the second processor.

Providing for processing data using a plurality of neural networks wherein the data comprises a sequence of data points; and comprising one or more processors configured to process the data and select an initial neural network matching a resource availability from the plurality of neural networks and; and processing the data comprises the one or more processors being configured to analyze data points of the sequence as the data points are received; determine a change to the resource availability based on a change of an indication; select a second one of the plurality of neural networks other than the initial neural network; transfer an internal state of the initial neural network to the second one of the plurality of neural networks; and process data points of the data sequence using the second one of the plurality of neural networks.

Providing for processing data using a plurality of neural networks wherein the plurality of neural networks are trained to the same task based on forcing the plurality of neural networks to similar internal states for the same input sequence.

Providing for processing data using a plurality of neural networks wherein the plurality of neural networks are trained to the same task at the same time.

Providing for processing data using a plurality of neural networks wherein the plurality of neural networks are trained to the same task based on a switching between ones of the plurality of neural networks during training comprising initializing the plurality of neural networks; creating a combination of the plurality of neural networks based on the one of the plurality of neural networks selected for the computation of a cell is based on an additional input; and training the combination by providing an augmented data set containing a) an initial task data set and b) a sequence of values for the additional input that will select one of the plurality of neural networks at every time step along a data sequence.

Providing for processing data using a plurality of neural networks as described herein wherein the plurality of neural networks comprises a recurrent neural network (RNN).

Providing for processing data using a plurality of RNN as described herein, wherein each of the plurality of RNN comprises one of a GRU, a LSTM or an end-to-end memory network.

Providing for processing data using a plurality of neural networks as described herein, wherein a resource requirement of one or more of the plurality of neural networks comprises a computational cost and/or an accuracy of the one or more of the plurality of neural networks.

Providing for processing data using a plurality of neural networks as described herein, wherein the plurality of neural networks comprises a plurality of RNN; the plurality of RNN comprises a plurality of hierarchical RNNs working on top of each other, wherein each level of the hierarchy includes one family of a plurality of RNN, or a family containing hierarchical models, or a combination of both.

Providing a computer program product including instructions, which, when executed by a computer, cause the computer to carry out any one or more of the methods described herein.

Providing a non-transitory computer readable medium storing executable program instructions to cause a computer executing the instructions to perform any one or more of the methods described herein.

Providing a device comprising an apparatus according to any embodiment of apparatus as described herein, and at least one of (i) an antenna configured to receive a signal, the signal including data representative of information such as instructions from an orchestrator, (ii) a band limiter configured to limit the received signal to a band of frequencies that includes the data representative of the information, and (iii) a display configured to display an image such as a displayed representation of the data representative of the instructions.

Providing a device as described herein, wherein the device comprises one of a television, a television signal receiver, a set-top box, a gateway device, a mobile device, a cell phone, a tablet, or other electronic device.

Various other generalized, as well as particularized embodiments are also supported and contemplated throughout this disclosure.

What is claimed is:

1. A method performed by a wireless transmit/receive unit (WTRU), the method comprising:

receiving an input data sequence;

receiving a first indication of a first constraint for processing a first portion of the input data sequence at a first time by a first neural network, wherein the first indication indicates a relationship between the first constraint and a characteristic of the first neural network for processing the first portion of the input data sequence;

receiving a second indication of a second constraint corresponding to a change in the first constraint for processing a second portion of the input data sequence at a second time by a second neural network that differs from the first neural network, wherein the second indication indicates a relationship between the second constraint and a characteristic of the second neural network for processing the second portion of the input data sequence;

determining, via the first neural network, a state for a first input element included in the first portion of the input data sequence based on the first input element and based on a previous state for a previous input element included in the first portion of the input data sequence;

determining, via the second neural network, a state for a second input element included in the second portion of the input data sequence based on the second input element and based on the state for the first input element; and processing, via the second neural network based on the state for the second input element, the second portion of the input data sequence based on the second constraint.

2. The method of claim 1, wherein:

the characteristic of the first neural network comprises at least one of a first computation cost or a first accuracy associated with the first neural network; and the characteristic of the second neural network comprises at least one of a second computation cost or a second accuracy associated with the second neural network.

3. The method of claim 1, wherein the first constraint comprises at least one of a computational resource availability or a data processing accuracy.

4. The method of claim 1, wherein the first neural network has a greater computational load than the second neural network, and wherein the first indication indicates a greater computational resource availability than the second indication.

5. The method of claim 4, further comprising:

transmitting, to a device other than the WTRU, at least one value indicating a difference in accuracy associated with the first neural network and the second neural network; or transmitting, to the device other than the WTRU, an expected delay associated with switching between using the first neural network and the second neural network for processing the input data sequence.

6. The method of claim 5, wherein the first neural network and the second neural network are included in a family of neural networks comprising at least one additional neural network, wherein each neural network in the family of neural networks is associated with a different computational load and a different accuracy, and wherein at least one of the computational load or accuracy associated with each neural network in the family of neural networks is transmitted to the device other than the WTRU.

7. The method of claim 6, wherein the family of neural networks is communicated in a package indicating available neural networks at the WTRU for processing the input data sequence, and wherein the package includes metadata that indicates the at least one of the computational load or the accuracy associated with each neural network in the family of neural networks.

8. The method of claim 4, wherein the first neural network comprises a first skip recurrent neural network (RNN) model, wherein the second neural network comprises a second skip RNN model, wherein the second skip RNN model has a lower computational load when processing the second portion of the input data sequence than a computational load of the first skip RNN model when processing the first portion of the input data sequence.

9. The method of claim 4, wherein the second neural network is adapted from the first neural network to enable processing of the second portion of the input data sequence with a lower computational load, and wherein the second neural network is configured to minimize a loss in accuracy from the first neural network.

10. The method of claim 1, wherein the input data sequence comprises video data or audio data, and wherein the processing of the first portion or the processing of the second portion is performed using an encoder or a decoder on the WTRU.

11. The method of claim 1, further comprising, prior to receiving the input data sequence:

receiving a training sequence of input elements;

determining, via the first neural network, a first sequence of respective states for the training sequence of input elements;

determining, via the second neural network, a second sequence of respective states for the training sequence of input elements; and training the second neural network by reducing a global loss, wherein the global loss is based at least on a state difference loss between the second sequence of respective states and the first sequence of respective states.

12. A wireless transmit receive unit (WTRU) comprising a processor, the processor configured to:

receive an input data sequence;

receive a first indication of a first constraint to process a first portion of the input data sequence at a first time by a first neural network, wherein the first indication indicates a relationship between the current constraint and a characteristic of the first neural network configured to process the first portion of the input data sequence;

while processing the first portion of the input data sequence by the first neural network, receive a second indication of a second constraint corresponding to a change in the first constraint to process a second portion of the input data sequence at a second time by a second neural network that differs from the first neural network, wherein the second indication indicates a relationship between the second constraint and a characteristic of the second neural network configured to process the second portion of the input data sequence;

determine, via the first neural network, a state for a first input element included in the first portion of the input data sequence based on the first input element and based on a previous state for a previous input element included in the first portion of the input data sequence;

determine, via the second neural network, a state for a second input element included in the second portion of the input data sequence based on the second input element and based on the state for the first input element; and process, via the second neural network based on the state for the second input element, the second portion of the input data sequence based on the second constraint.

13. The WTRU of claim 12, wherein:

the characteristic of the first neural network comprises at least one of a first computation cost or a first accuracy associated with the first neural network; and the characteristic of the second neural network comprises at least one of a second computation cost or a second accuracy associated with the second neural network.

14. The WTRU of claim 12, wherein the first constraint comprises at least one of a computational resource availability or a data processing accuracy.

15. The WTRU of claim 12, wherein the first neural network has a greater computational load than the second neural network, and wherein the first indication indicates a greater computational resource availability than the second indication.

16. The WTRU of claim 15, further comprising a transceiver, and wherein the processor is further configured to:

transmit, via the transceiver to a device other than the WTRU, at least one value indicating a difference in accuracy associated with the first neural network and the second neural network; or transmit, via the transceiver to the device other than the WTRU, an expected delay associated with switching between using the first neural network and the second neural network for processing the input data sequence.

17. The WTRU of claim 16, wherein the first neural network and the second neural network are included in a family of neural networks comprising at least one additional neural network, wherein each neural network in the family of neural networks is associated with a different computational load and a different accuracy, and wherein the processor is further configured to transmit, via the transceiver, at least one of the computational load or accuracy associated with each neural network in the family of neural networks to the device other than the WTRU.

18. The WTRU of claim 17, wherein the processor is configured to communicate, via the transceiver, the family of neural networks in a package indicating available neural networks at the WTRU for processing the input data sequence, and wherein the package includes metadata that indicates the at least one of the computational load or the accuracy associated with each neural network in the family of neural networks.

19. The WTRU of claim 15, wherein the first neural network comprises a first skip recurrent neural network (RNN) model, wherein the second neural network comprises a second skip RNN model, wherein the second skip RNN model has a lower computational load when processing the second portion of the input data sequence than a computational load of the first skip RNN model when processing the first portion of the input data sequence.

20. The WTRU of claim 15, wherein the second neural network is adapted from the first neural network to enable the processor to process the second portion of the input data sequence with a lower computational load, and wherein the second neural network is configured to minimize a loss in accuracy from the first neural network.

21. The WTRU of claim 12, wherein the input data sequence comprises video data or audio data, and wherein the processor is configured to process the first portion or the second portion using an encoder or a decoder on the WTRU.

22. The WTRU of claim 12, wherein the processor is further configured to, prior to receiving the input data sequence:

receive a training sequence of input elements;

determine, via the first neural network, a first sequence of respective states for the training sequence of input elements;

determine, via the second neural network, a second sequence of respective states for the training sequence of input elements; and train the second neural network by reducing a global loss, wherein the global loss is based at least on a state difference loss between the second sequence of respective states and the first sequence of respective states.

* * * * *